United States Patent [19]

Shu et al.

[11] Patent Number: 4,901,360

[45] Date of Patent: Feb. 13, 1990

[54] GATED ARCHITECTURE FOR COMPUTER VISION MACHINE

[75] Inventors: David B. Shu, Canoga Park; James G. Nash, Los Angeles, both of Calif.

[73] Assignee: Hughes Aircraft Company, Los Angeles, Calif.

[21] Appl. No.: 113,084

[22] Filed: Oct. 23, 1987

[51] Int. Cl.$^4$ .............................................. C06K 9/36
[52] U.S. Cl. ....................................... 382/41; 382/27; 382/49; 364/200
[58] Field of Search ................. 382/27, 34, 41, 49; 364/131, 133, 229, 229.41, 229.5

[56] References Cited

U.S. PATENT DOCUMENTS

| | | | |
|---|---|---|---|
| 4,215,401 | 7/1980 | Holsztynski et al. | 382/41 |
| 4,224,600 | 9/1980 | Sellner | 382/41 |
| 4,309,691 | 1/1982 | Castleman | 382/6 |
| 4,384,273 | 5/1983 | Ackland et al. | 382/27 |
| 4,574,394 | 3/1986 | Holsztynski et al. | 382/41 |
| 4,601,055 | 7/1986 | Kent | 382/49 |
| 4,622,632 | 11/1986 | Tanimoto et al. | 364/200 |
| 4,783,738 | 11/1988 | Li et al. | 382/49 |
| 4,809,346 | 2/1989 | Shu | 382/27 |
| 4,809,347 | 2/1989 | Nash et al. | 382/27 |

OTHER PUBLICATIONS

A. Merigot et al, "Sphinx, A Pyramidal Approach to Parallel Image Processing", 1985 IEEE Computer Society Workshop on Computer Architecture for Pattern Analysis and Image Database Management, Nov. 1985, pp. 107-111.
Payton, "A Symbolic Pixel Array for Representation of Spatial Knowledge", Proceedings of the Third Annual International Phoenix Conference on Computers and Communications, 1984, pp. 11-16.
Reynolds et al, "Hierarchical Knowledge-Directed Object Extraction Using a Combined Region and Line Representation," Proceedings of Image Understanding Workshop, 1984, pp. 195-204.
Levitan et al, "Signal to Symbols: Unblocking the Vision Communications/Control Bottleneck", VSLI Signal Processing, IEEE Press, 1984, pp. 411-420.
Lawton et al, "Iconic to Symbolic Processing Using a Content Addressable Array Parallel Processor," Proceedings of Image Understanding Workshop, Oct. 1984, pp. 316-332.
"Iconic to Symbolic Processing Using a Content Addressable Array Parallel Processor," Proceedings of Image Understanding Workshop (1984), pp. 316-322, by Lawton, Levitan, Weems, Riseman, and Hanson.
"An Expert System for Object Recognition in Natural Scenes", J. H. Kim et al, IEEE Journal 1984, pp. 170-175.
Cantoni et al: "PAPIA: Pyramidal Architectures for Parallel Image Analysis", Proceedings 7th Symposium on Computer Arithmetic, Ubana, Ill., 4-6 Jun. 1985, IEEE (U.S.), pp. 237-242.
R. M. Logheed et al: "Multi-Processor Architectures for Machine Vision and Image Analysis", Proceedings of the 1985 International Conference on Parallel Processing, 20-23 Aug. 1985, IEEE (U.S.), pp. 493-497.
"Signal to Symbols: Unblocking the Vision Communications/Control Bottleneck", Steven P. Levitan, Charles C. Weems and Edward M. Riseman; VLSI Signal Processing; pp. 411-420, Nov. 1984.
Moldovan et al, "Parallel Processing of Iconic to Symbolic Transformation of Images", IEEE Proceedings on Computer Vision and Pattern Recognition, San Francisco, Calif., Jun. 19-25, 1985, pp. 257-264.

Primary Examiner—Leo H. Boudreau
Assistant Examiner—Jose L. Couso
Attorney, Agent, or Firm—V. D. Duraiswamy; Wanda K. Denson-Low

[57] ABSTRACT

A computer architecture 10 for performing iconic and symbolic operations on image data is disclosed. Three levels of processing elements (CAAPP, ICP, GPPA) are disclosed. The processing elements in the lowest level (CAAPP) are provided with a plurality of controllable gates (N, S, E, W, H, V, NW, NE) that are used to selectively connect together processing elements in that level. In such manner, certain algorithms such as the minimum spanning tree algorithm can be efficiently performed.

12 Claims, 23 Drawing Sheets

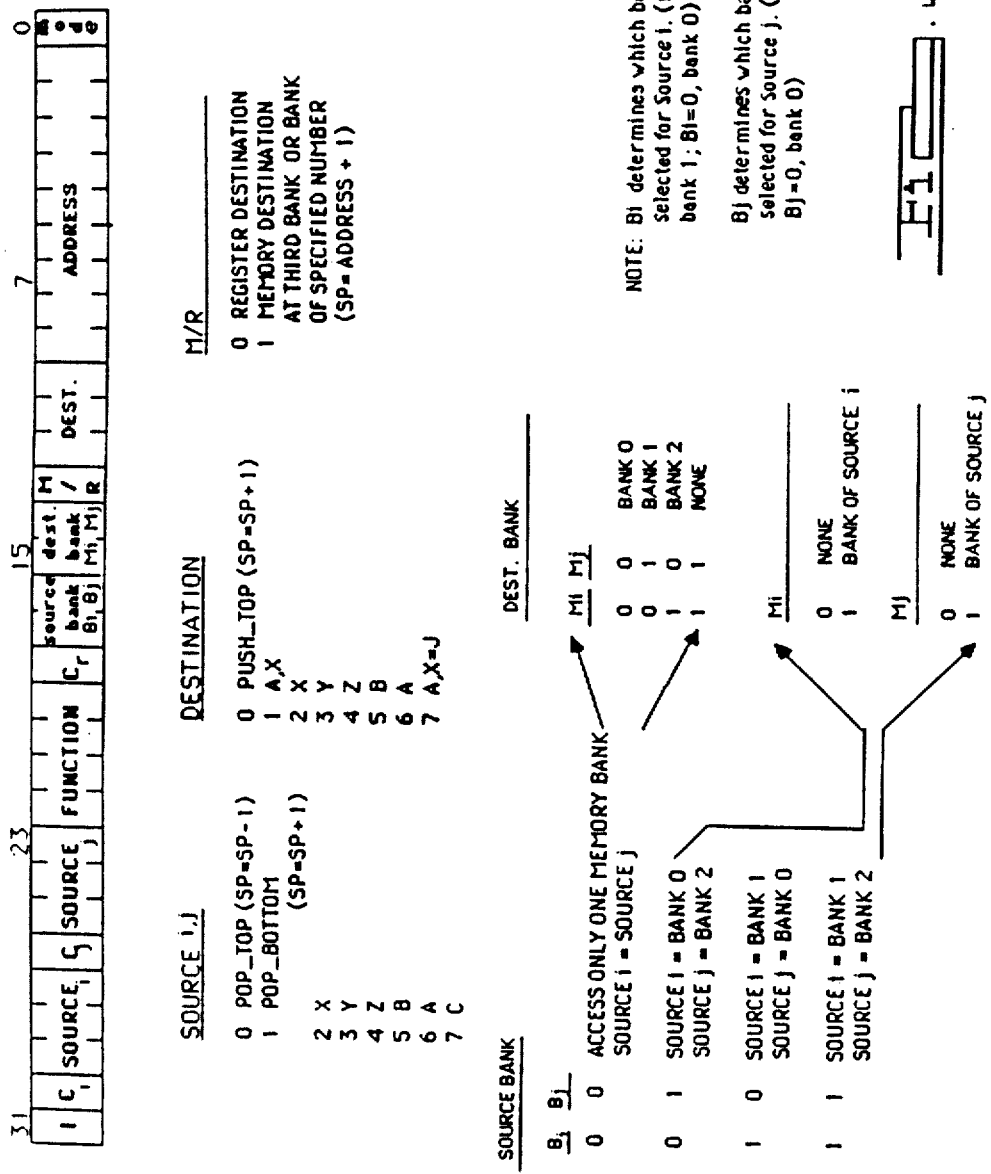

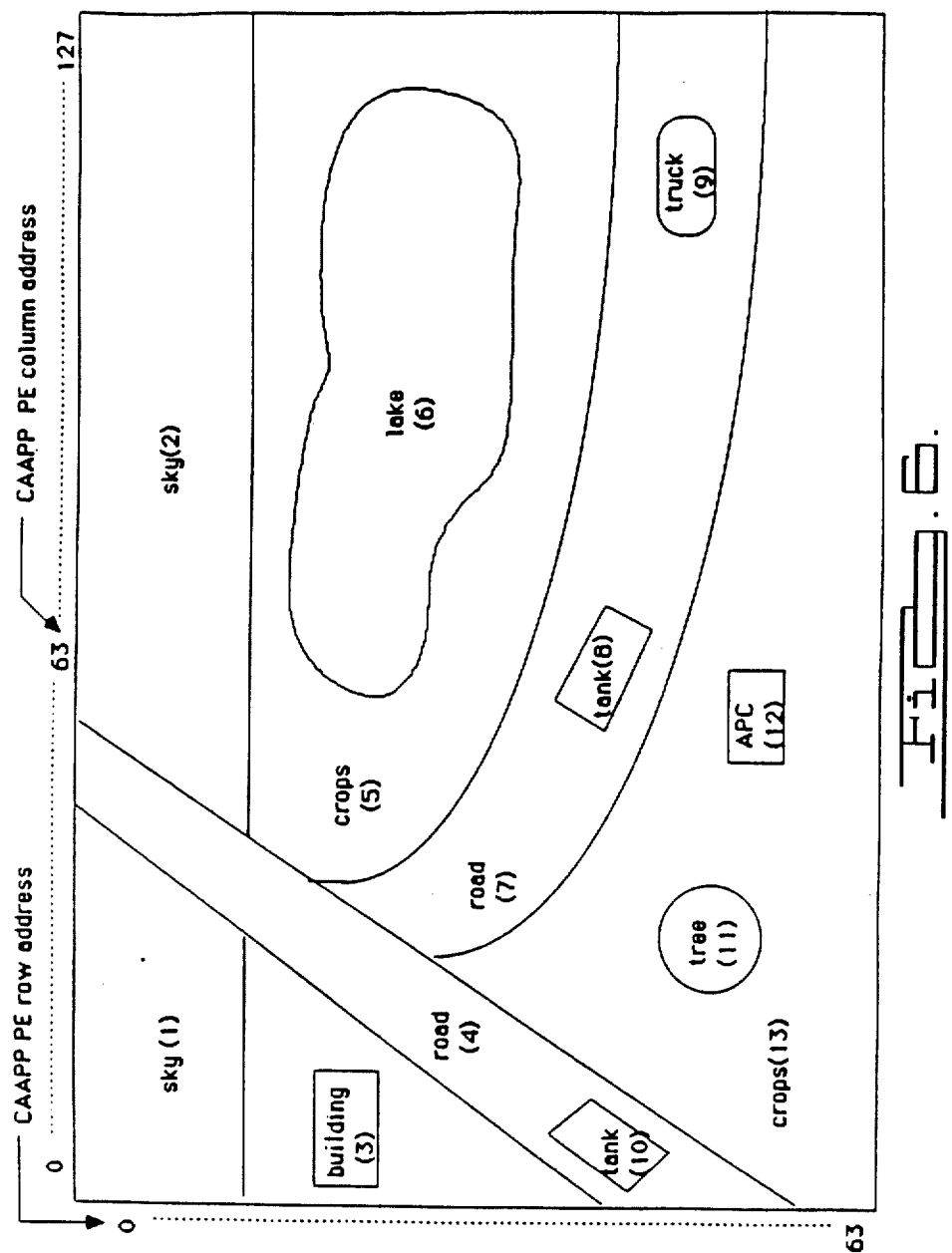

| | ICP PE row address, | | | | ICP PE column address | | | |
|---|---|---|---|---|---|---|---|---|
| | 0 | 1 | 2 | 3 | 4 | 5 | 6 | 7 |
| 0 | sceneobj-1<br>area: xxx<br>peri: xxx<br>tact: NIL<br>terr: NIL<br>space: NIL | | | | | sceneobj-4<br>area: xxx<br>peri: xxx<br>tact: NIL<br>terr: NIL<br>space: NIL | sceneobj-2<br>area: xxx<br>peri: xxx<br>tact: NIL<br>terr: NIL<br>space: NIL | |
| 1 | | | | | sceneobj-5<br>area: xxx<br>peri: xxx<br>tact: NIL<br>terr: NIL<br>space: NIL | | | |
| 2 | sceneobj-3<br>area: xxx<br>peri: xxx<br>tact: NIL<br>terr: NIL<br>space: NIL | | | | sceneobj-7<br>area: xxx<br>peri: xxx<br>tact: NIL<br>terr: NIL<br>space: NIL | | | sceneobj-6<br>area: xxx<br>peri: xxx<br>tact: NIL<br>terr: NIL<br>space: NIL |
| 3 | | | | sceneobj-13<br>area: xxx<br>peri: xxx<br>tact: NIL<br>terr: NIL<br>space: NIL | | | | |
| 4 | sceneobj-10<br>area: xxx<br>peri: xxx<br>tact: NIL<br>terr: NIL<br>space: NIL | | | | | | sceneobj-8<br>area: xxx<br>peri: xxx<br>tact: NIL<br>terr: NIL<br>space: NIL | |
| 5 | | | | sceneobj-11<br>area: xxx<br>peri: xxx<br>tact: NIL<br>terr: NIL<br>space: NIL | | | | |
| 6 | | | | | | | sceneobj-12<br>area: xxx<br>peri: xxx<br>tact: NIL<br>terr: NIL<br>space: NIL | |
| 7 | | | | | | | | |

FIG. 9.

← ICP PE row address, ICP PE column address →

|   | 0 | 1 | 2 | 3 | 4 | 5 | 6 | 7 |
|---|---|---|---|---|---|---|---|---|
| 0 | | | | | | | | |
| 1 | | | | | | | | |
| 2 | sceneobj-3<br>area: xxx<br>peri: xxx<br>tact: 2,1<br>terr: NIL<br>space: NIL | tactical-3<br>texture eng<br>ded : xxx<br>ind : xxx<br>fixed: 3,1<br>mobil: NIL | | | | | | |
| 3 | | | | | | | | |
| 4 | sceneobj-10<br>area: xxx<br>peri: xxx<br>tact: 4,1<br>terr: NIL<br>space: NIL | tactical-10<br>texture eng<br>ded : xxx<br>ind : xxx<br>fixed: NIL<br>mobil: 5,1 | | | | | sceneobj-8<br>area: xxx<br>peri: xxx<br>tact: 4,7<br>terr: NIL<br>space: NIL | tactical-8<br>texture eng<br>ded : xxx<br>ind : xxx<br>fixed: NIL<br>mobil: 5,7 |
| 5 | | | | sceneobj-11<br>area: xxx<br>peri: xxx<br>tact: 6,3<br>terr: 5,4<br>space: NIL | | | | |
| 6 | | | | tactical-11<br>texture eng<br>ded : xxx<br>ind : xxx<br>fixed: NIL<br>mobil: NIL | | | sceneobj-12<br>area: xxx<br>peri: xxx<br>tact: 6,7<br>terr: NIL<br>space: NIL | tactical-12<br>texture eng<br>ded : xxx<br>ind : xxx<br>fixed: 7,6<br>mobil: 7,7 |
| 7 | | | | | | | | |

FIG. 10.

|  | ICP PE row address, | | | ICP PE column address | | | | |
|---|---|---|---|---|---|---|---|---|
|  | 0 | 1 | 2 | 3 | 4 | 5 | 6 | 7 |
| 0 | | | | | | | | |
| 1 | | | | | | | | |
| 2 | | | | | | | | |
| 3 | | | | | | | | |
| 4 | | sceneobj-10 tactical-10<br>area: xxx, texture eng<br>peri: xxx, ded: xxx<br>tact: 4,1, ind: xxx<br>terr: NIL, fixed: NIL<br>space: NIL, mobil: 5,1 | | | | | | |
| 5 | | mobil-10<br>texture eng<br>ded: 5,2<br>ind: 2,3<br>tire: NIL<br>tracked: NIL | wheel-14<br>texture eng<br>ded: xxx<br>ind: 5,1 | | | | | |
| 6 | | sceneobj-14<br>area: xxx<br>peri: xxx<br>GM, IM<br>CM<br>wheel: 5,2 | | | | | | sceneobj-12 tactical-12<br>area: xxx, texture eng<br>peri: xxx, ded: xxx<br>tact: 6,7, ind: xxx<br>terr: NIL, fixed: 7,6<br>space: NIL, mobil: 7,7 |
| 7 | | | | | APC-12<br>texture eng<br>ded: xxx<br>ind: xxx<br>tank: NIL<br>APC: 7,3 | tracked-12<br>texture eng<br>ded: xxx<br>ind: xxx<br>truck: NIL<br>jeep: NIL | tire-12<br>texture eng<br>ded: xxx<br>ind: xxx<br>building: NIL | fixed-12, mobil-12<br>texture eng texture eng<br>ded: xxx, ded: xxx<br>ind: xxx, ind: xxx<br>tire: 7,5<br>tracked: 7,1 |

ICP PE row address, ICP PE column address

| | 0 | 1 | 2 | 3 | 4 | 5 | 6 | 7 |
|---|---|---|---|---|---|---|---|---|
| 0 | sceneobj-1<br>area: xxx<br>peri: xxx<br>tact: NIL<br>terr: 0,1<br>space: 1,0 | terrain-1<br>texture eng<br>ded: xxx<br>ind: xxx<br>land: NIL<br>water: NIL | | land-4<br>texture eng<br>ded: xxx<br>ind: xxx<br>tree: NIL<br>path: 1,3 | terrain-4<br>texture eng<br>ded: xxx<br>ind: xxx<br>land: 0,3<br>water: NIL | sceneobj-4<br>area: xxx<br>peri: xxx<br>tact: NIL<br>terr: 0,4<br>space: NIL | sceneobj-2<br>area: xxx<br>peri: xxx<br>tact: NIL<br>terr: NIL<br>space: 0,7 | space-2<br>texture eng<br>ded: xxx<br>ind: xxx<br>sky: NIL |
| 1 | space-1<br>texture eng<br>ded: xxx<br>ind: xxx<br>sky: 1,1 | sky-1<br>texture eng<br>ded: xxx<br>ind: xxx | | path-4<br>texture eng<br>ded: xxx<br>ind: xxx<br>road: 2,3<br>track: NIL | sceneobj-5<br>area: xxx<br>peri: xxx<br>tact: NIL<br>terr: NIL<br>space: NIL | | | |
| 2 | sceneobj-3<br>area: xxx<br>peri: xxx<br>tact: 2,1<br>terr: NIL<br>space: NIL | tactical-3<br>texture eng<br>ded: xxx<br>ind: xxx<br>fixed: 3,1<br>mobil: NIL | | road-4<br>texture eng<br>ded: xxx<br>ind: xxx | sceneobj-7<br>area: xxx<br>peri: xxx<br>tact: NIL<br>terr: 2,5<br>space: NIL | terrain-7<br>texture eng<br>ded: xxx<br>ind: xxx<br>land: 3,5<br>water: NIL | | sceneobj-6<br>area: xxx<br>peri: xxx<br>tact: NIL<br>terr: NIL<br>space: NIL |
| 3 | | fixed-3<br>texture eng<br>ded: xxx<br>ind: xxx<br>building: 3,2 | building-3<br>texture eng<br>ded: xxx<br>ind: xxx | sceneobj-13<br>area: xxx<br>peri: xxx<br>tact: NIL<br>terr: NIL<br>space: NIL | path-7<br>texture eng<br>ded: xxx<br>ind: xxx | land-7<br>texture eng<br>ded: xxx<br>ind: xxx<br>tree: NIL<br>path: 3,4 | | |
| 4 | sceneobj-10<br>area: xxx<br>peri: xxx<br>tact: 4,1<br>terr: NIL<br>space: NIL | tactical-10<br>texture eng<br>ded: xxx<br>ind: xxx<br>fixed: NIL<br>mobil: 5,1 | | | | | sceneobj-8<br>area: xxx<br>peri: xxx<br>tact: 4,7<br>terr: NIL<br>space: NIL | tactical-8<br>texture eng<br>ded: xxx<br>ind: xxx<br>fixed: NIL<br>mobil: 5,7 |
| 5 | | mobil-10<br>texture eng<br>ded: 5,2<br>ind: 2,3<br>tire: NIL<br>tracked: NIL | wheel-14<br>texture eng<br>ded: xxx<br>ind: 5,1 | sceneobj-11<br>area: xxx<br>peri: xxx<br>tact: NIL<br>terr: 5,4<br>space: NIL | terrain-11<br>texture eng<br>ded: xxx<br>ind: xxx<br>land: 5,5<br>water: NIL | land-11<br>texture eng<br>ded: xxx<br>ind: xxx<br>tree: 5,6<br>path: NIL | tree-11<br>texture eng<br>ded: xxx<br>ind: xxx | mobil-8<br>texture eng<br>ded: xxx<br>ind: xxx<br>tire: NIL<br>tracked: 6,5 |
| 6 | | sceneobj-14<br>area: xxx<br>peri: xxx<br>GM,IM<br>CM<br>wheel: 5,2 | | | | tracked-8<br>texture eng<br>ded: xxx<br>ind: xxx<br>tank: NIL<br>APC: NIL | sceneobj-12<br>area: xxx<br>peri: xxx<br>tact: 6,7<br>terr: NIL<br>space: NIL | tactical-12<br>texture eng<br>ded: xxx<br>ind: xxx<br>fixed: 7,6<br>mobil: 7,7 |
| 7 | | | | APC-12<br>texture eng<br>ded: xxx<br>ind: xxx<br>tank: NIL<br>APC: 7,3 | tracked-12<br>texture eng<br>ded: xxx<br>ind: xxx<br>truck: NIL<br>jeep: NIL | tire-12<br>texture eng<br>ded: xxx<br>ind: xxx | fixed-12<br>texture eng<br>ded: xxx<br>ind: xxx<br>building: NIL | mobil-12<br>texture eng<br>ded: xxx<br>ind: xxx<br>tire: 7,5<br>tracked: 7,4 |

| Steps | Index I | PE r,c binary | 2 010 | 3 011 | 4 100 | 5 101 | 6 110 |
|---|---|---|---|---|---|---|---|
| 0 | Start | X<br>A<br>M(LBL) | 1<br>1<br>0 | 1<br>1<br>0 | 1<br>1<br>0 | 1<br>1<br>0 | 1<br>1<br>0 |
| 1 | 3 | X<br>A<br>M(LBL) | 1<br>1<br>0 | 1<br>1<br>0 | 0<br>0<br>0 | 0<br>0<br>0 | 0<br>0<br>0 |
| 2 | 2 | X<br>A<br>M(LBL) | 0<br>1<br>1 | 0<br>1<br>1 | —<br>—<br>1 | —<br>—<br>1 | —<br>—<br>1 |
| 3 | 1 | X<br>A<br>M(LBL) | 1<br>1<br>0 | 0<br>0<br>0 | —<br>—<br>0 | —<br>—<br>0 | —<br>—<br>0 |

FIG. 21.

GATED ARCHITECTURE FOR COMPUTER VISION MACHINE

This invention was made with Government support under contract No. DACA 76-86-C-0015 awarded by the Department of the Army. The U.S. Government has certain rights in this invention.

CROSS REFERENCE TO RELATED APPLICATIONS

This application is related to U.S. Ser. No. 887,847 filed July 18, 1986, entitled "Computer Vision Architecture" and to U.S. Ser. No. 013,481, filed Feb. 11, 1987 entitled "Computer Vision Architecture for Iconic to Symbolic Transformation", both applications being assigned to the same assignee as the present invention.

BACKGROUND OF THE INVENTION

1. Technical Field

This invention relates to image understanding machines and, more particularly, to computer architectures capable of both arithmetic or iconic and symbolic processing of image data.

2. Description of Related Art

There exists a need for a computer system that is capable of both arithmetic or iconic and symbolic processing of image data which is designed specifically for use in computer vision research and analyses efforts. Such a system can be used in a variety of different applications such as for use in real time processing of data from radar, infrared and visible sensors in areas such as aircraft navigation and reconnaissance. Another application of such a machine would be as a development system for use in vision laboratories in the implementation and simulation of many computationally intensive algorithms.

Machines which are capable of operating on image data (as compared to merely arithmetic data) are referred to alternatively as image processors, vision computers, image understanding machines and the like. Image understanding machines are sometimes thought of as a higher level machine than an image processor which is typically referred to as a machine for enhancing and classifying images whereas an image understanding machine involves the automatic transformation of the image to symbolic form, effectively providing a high level description of the image in terms of objects, their attributes, and their relationship to other objects in the image. The present invention is directed to this latter type of machine (although it can do the lower level tasks as well) and shall be referred to as an image understanding machine (IUM).

It is generally recognized that a high level IUM must be capable of performing two basic types of computations: arithmetic or iconic processing and symbolic manipulation. Thus, it would be desirable to provide an IUM that is capable of performing a number of visual information processing algorithms such as those listed in the following Table I.

TABLE I

A. LOW LEVEL VISION
  Edge Detection
    Differentiation
    Edge fitting
    Template matching
    Convolution
  Transform methods
  Histogramming
  Thresholding
  Local segmentation B. MID LEVEL VISION
  Line and Curve Fitting
    Hough Transform
    Projection
    Graph search
  Segmentation
    Recursive segmentation
    Region growing
    Boundary tracing
  Inference of 3-D surfaces
    Stereo
    Shape from shading and shadows
    Motion analysis
  Shape analysis
    2-D features
    Generalized cones
  Structures
    Projection, rotation
    Angles and transcendentals
    Hough-like parameter spaces
  Surfaces
    Graph operations
    Color constancy
    Surface interpolation
    Structure from motion
    Iterative least squares C. HIGH LEVEL VISION
  Object recognition
    Graph matching
    Relaxation labeling
    Line matching
    Constraint satisfaction
    Symbolic modeling and manipulation
    Geometric reasoning
  Scene inferences
    Analysis using contextual information
    Production systems It should be noted that future algorithmic developments will be a continually and rapidly evolving activity resulting from changing applications, advances in sensor and solid state technologies, and the need for added intelligence to deal even more rapidly and effectively with ever increasing amounts of raw data.

Many of the known concurrent or parallel processing computer architectures are not specifically intended to be used for image understanding purposes. Other image processing systems also suffer from the inability to efficiently perform both numeric and symbolic computations. For example, some of the prior architectures do not lend themselves to efficiently execute various artificial intelligent techniques such as frames, rules and evidential reasoning, while at the same time being capable of efficiently doing more iconic related image processing algorithms. One of the major drawbacks in the prior computer architectures was that their designs generally necessitated the transfer of large amounts of data between a host computer and the special purpose vision computer. Unfortunately, the transfer of data and instructions in the known architectures resulted in relatively slow operational speed. It is, of course, one of the ultimate objectives in any computer system to increase the speed of operation without unduly increasing costs or complexity of operation.

In performing some higher level vision processing techniques, it becomes necessary to apply unique labels to regions of contiguous pixels having the same value. For a binary image the pixels are either 0's (background) or 1's (data). Each region is defined as a group of contiguous pixels having the value of 1, i.e., each pixel in the region is connected to a neighboring pixel that also has a value of 1. These regions often represent objects of interest in the scene. In order for the image understanding machine to extract these regions for further processing, each individual region should be assigned its own identification code or label. A technique is disclosed herein for applying these labels to the regions very quickly so that the IUM can use these labels in further analyzing the regions.

It has been suggested to apply these labels to segmented image regions by the use of a diffusion process (i.e., label propagation) by logically resolving the collisions between adjacent pixels. The time it takes to logically propagate the labels is proportional to the image size and consequently, it is very slow for most images. On the other hand, the technique taught herein provides an improved architecture and method to apply unique region labels significantly faster.

It would also be desirable to provide a computer architecture capable of handling not only vision tasks but also resource allocation, operation research and route replanning. For example, minimum spanning tree (MST) algorithms can be critical computations in some linear programming problems. Prior art array processors can perform such algorithms but are relatively slow.

SUMMARY OF THE INVENTION

The present invention is an improvement of the image understanding machine disclosed in copending U.S. patent application Ser. No. 887,847, filed July 18, 1986 entitled "Computer Vision Architecture"and Ser. No. 013,481, filed Feb. 11, 1987 entitled "Computer Vision Architecture for Iconic to Symbolic Transformation". For ease in understanding the improvement, the present application also includes a description of the IUM of the previous applications. The primary focus of the present application is described in Section G entitled "Improved Gated Architecture". Briefly, each first level processing element is provided with eight control gates corresponding to North, East, West, South, Northwest, Northeast, Horizontal and Vertical directions. The opening and closing of these gates can be controlled so as to facilitate faster implementation of certain operations such as performing the minimum spanning tree algorithm.

As noted above and by way of background, architecture for an image understanding machine is disclosed herein which is also described in the aforementioned parent application for performing both iconic and symbolic operations on image data in the form of a matrix of pixels. The machine includes a first level of image processing elements (PEs) for operating on the image matrix on a pixel per processing element basis. Each PE of the first level is adapted to communicate with each other. A second level of processing elements is provided for operating on a plurality of pixels associated with a given array of the PEs of the first level. Each second level processing element is associated with a group of first level processing elements and communicates therewith as well as with other second level processing elements. A third level of processing elements is provided for performing such functions as instructing the first and second level PEs. It is also designed to operate on a larger segment of the matrix than the second level processing elements. Each third level processing element is associated with a given number of second level processing elements and communicates therewith as well as with other third level processing elements. A host computer communicating with at least each third level processing element is provided for performing such functions as instructing the third level PEs.

This computer architecture is designed to solve the problem of the disparities in granularity from iconic processing to symbolic processing. By the term "granularity" it is meant that the processing power of each PE at a given level is comparable to the area (i.e., grain size) of the image segment associated with it. The larger the grain size the more powerful the PE becomes.

This architecture in general provides an efficient implementation match at each level of granularity. Thus, for iconic processing which requires the smallest granularity, a processor per pixel approach is provided (i.e., the first level processing elements) to efficiently perform these tasks. On the other hand, for higher level or more sophisticated operations the third level processing elements are provided which can be implemented in the form of general purpose microprocessors.

The computer architecture provides parallelism at substantially all levels of computation. Thus, bottlenecks which are often associated with serial computations or communications are avoided. The approach of the present invention also provides an effective means of communication back and forth between signal processing activities and the symbolic activities. The interconnection system of the machine of this invention connects different types of concurrent processors in such a way as to match the characteristics of most computer vision problems and the manner in which they are solved by way of implementing various algorithms. In addition, the architecture provides a modular, reliable and relatively low cost approach.

Among the advantages and characteristics of this architecture include:

hardware to match problem granularity,
parallel operation throughout problem,
high efficiency for symbolic operation,
the capability to perform both low-level (iconic) and high-level (symbolic) processing,
a high degree of parallelism (up to $10^6$ concurrent elements),
three levels of parallelism in system hierarchy,
a highly testable structure of identical elements,
optimal locality of operation—data essentially remains in place throughout,
minimal demands on global data bus bandwidth,
and identical processing elements of relatively simple design.

BRIEF DESCRIPTION OF THE DRAWINGS

The various advantages of the present invention will become apparent to one skilled in the art upon reading the following specification and by reference to the drawings in which:

FIG. 5 is a schematic illustration of a microinstruction set for the first level processing elements;

FIGS. 6–12 are diagrammatic illustrations useful in understanding an example of a method of using the machine;

FIG. 21 is a table useful in understanding the steps performed in a specific example.

DESCRIPTION OF THE PREFERRED EMBODIMENT

A. Overview

Figure 1:
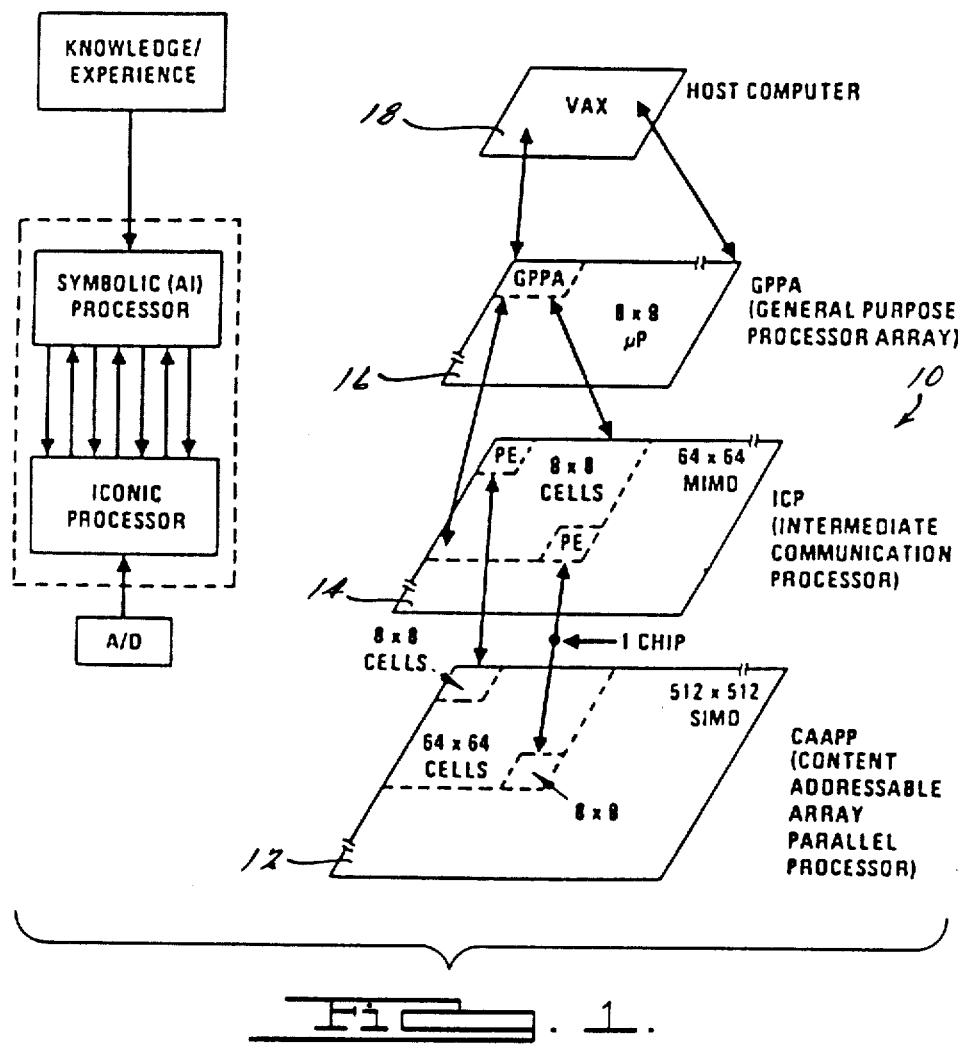
FIG. 1 is a functional diagrammatic view of an image understanding machine.

The computer architecture for the image understanding machine 10 of the preferred embodiment is shown in FIG. 1. The architecture is based on a hierarchical organization having four levels of processing elements. For purposes of this invention, the term "processing element" is defined as a computational module consisting of a central processing unit (CPU), a memory, and an associated communication unit permitting transfer of data into and out of the module.

The first level 12 of processing elements is a 512×512 array of content addressable parallel processors (CAAPP). CAAPP 12 is a mesh-connected, bit-serial array of processing elements having an associative or content-addressable parallel processing capability. The term "mesh connected" means that connections are provided to neighboring PEs in the north, east, west, and south directions. A "bit-serial array" is an array of PEs, each of which can operate on bit operands and generate one result bit with an appropriate carry bit. For purposes of this invention the terms "associative or content addressable parallel processing capability" means that all of the PEs in the array can simultaneously match a given pattern against a portion of its memory and flag the individual result.

At the next higher level or second level 14, a 64×64 intermediate communication processor array (ICP) is provided. Each processing element (PE) of the ICP array is a multi-bit parallel processor. Presently a 16-bit parallel processor design is preferred. A third level 16 consists of an 8×8 general purpose processor array (GPPA) where each PE in that level is a powerful 32-bit microprocessor such as Motorola 68020. At the highest level 18 there is provided a system controller or host computer such as a VAX Model No. 11/750 computer manufactured by Digital Equipment Corporation.

Image data can be collected from a wide variety of sensors known in the art. Machine 10 is designed to operate on such image data which generally takes the form of a matrix of picture elements or pixels. Typically, each pixel contains a value of from 0 to 255 depending upon characteristics of points in the scene with which the pixel is associated. Each picture or frame of a given scene is generally represented by an N×N matrix where N is typically 512 or 256. The machine 10 of the present invention contains a sufficient number of low level 12 processing elements 512×512) such that there is proVided at least one PE per pixel in the image matrix being analyzed. Thus, each CAAPP PE is adapted to operate on the image matrix on a pixel per PE basis. Machine 10 is constructed such that each CAAPP PE is mesh connected so that it can communicate with each of its neighboring PEs in all directions so that each CAAPP PE can thereby communicate with each PE in that level.

Each PE in the ICP level 14 is associated with an array of CAAPP PEs. In the preferred embodiment, each ICP PE is connected to an 8×8 array of CAAPP PEs. Consequently, each ICP PE is capable of operating on 64 pixels of the matrix. Each ICP PE is constructed so that it communicates with other ICP PEs as well as with the CAAPP PE array to which it is associated. Each GPPA PE is adapted to instruct the CAAPP and ICP processing elements to which it is associated, as well as to operate on a larger segment of the image matrix than the ICP PEs. The GPPA processing elements are associated with a given number of ICP processing elements and communicate therewith, as well as with other GPPA processing elements. In this embodiment, each GPPA processor is designed to operate on 4,096 pixels in the image matrix.

Figure 2:
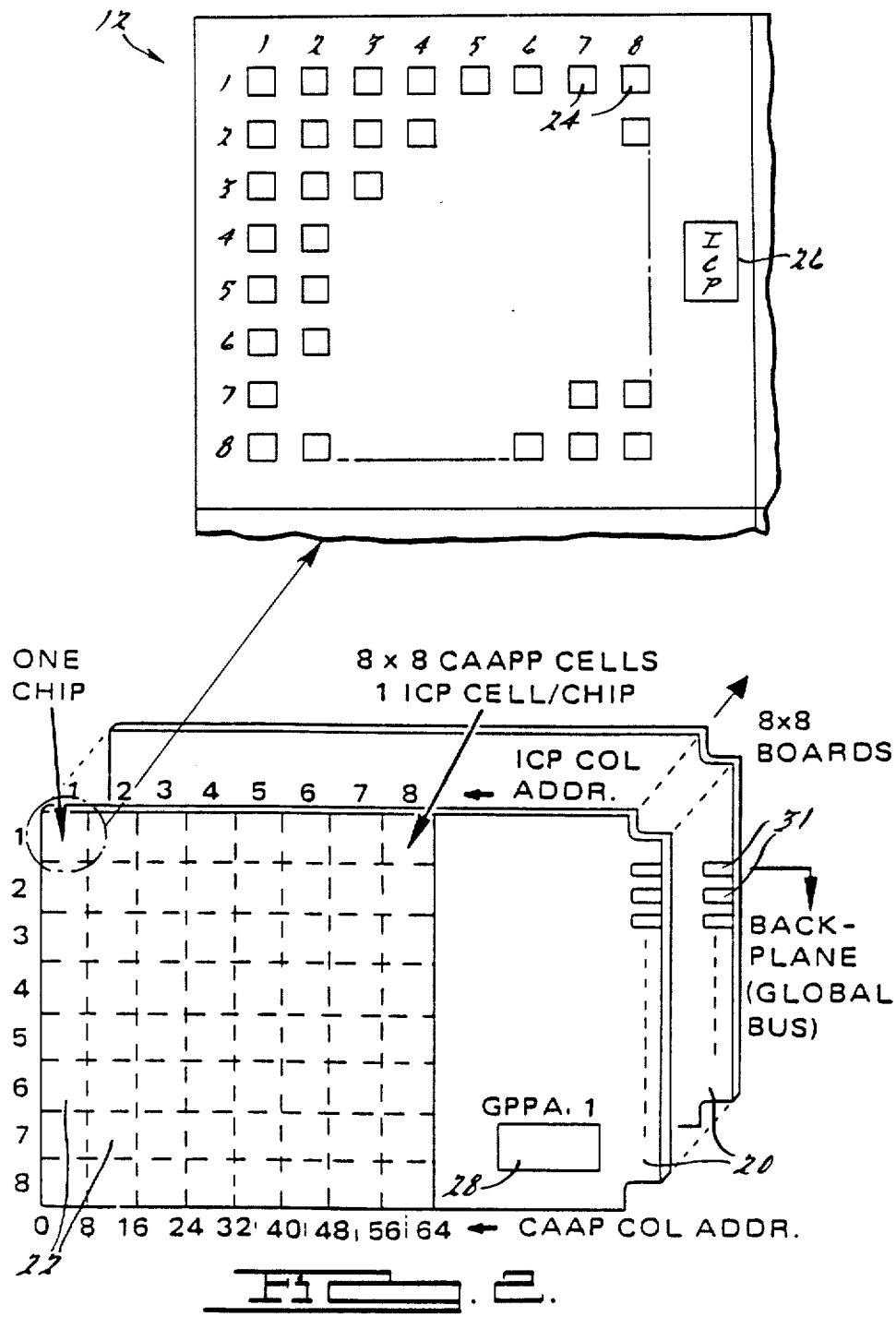
FIG. 2 is a perspective view schematically illustrating the organization of the various processing elements on a plurality of circuit boards.

The machine 10 of the present invention can be readily implemented, for example, by the construction illustrated in FIG. 2. Each circuit board 20 contains an 8×8 array of integrated circuit chips 22. Each chip 22 contains an 8×8 array of CAAPP PEs 24 and one ICP PE 26, integrated together as a single entity on a semiconductor. Each circuit board 20 will include one GPPA PE 28. By duplicating the printed circuit board structures shown in FIG. 2 it is possible to build an entire machine 10 with a theoretically unlimited capacity.

The CAAPP level 12 is designed to function primarily in the iconic domain, i.e., where the operations are based primarily on arithmetic manipulations of the image data. However, the CAAPP level is also capable of providing primitive symbolic information to the ICP level 14 and for performing low granularity symbolic operations. The ICP level 14 is designed primarily for intermediate level symbolic operations such as subgraph matching in conjunction with the CAAPP level processing and for numerically intensive computations. The GPPA level 16 serves as a controller for instructing the processing elements of the ICP and CAAPP levels. It also can be used to provide a capability for efficient allocation of resources and as a local general purpose processor.

Figure 3:
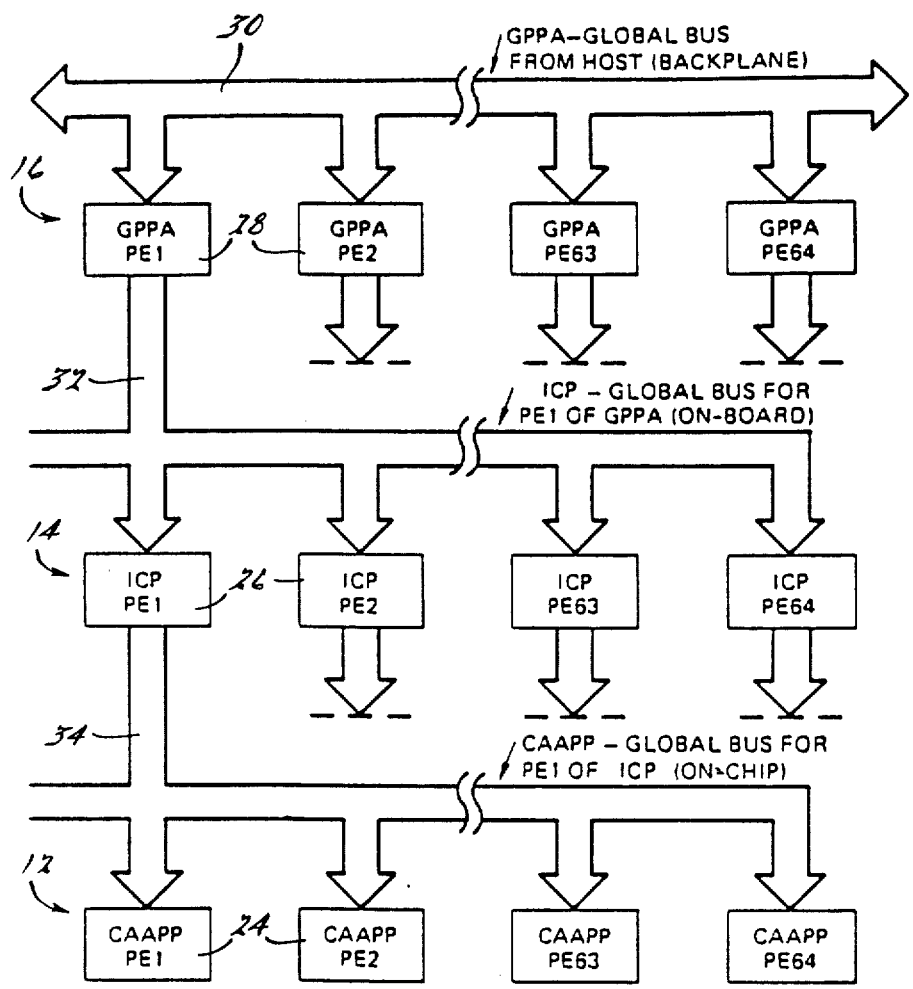
FIG. 3 is a schematic diagram showing the bus structure for communication with the various level of processing elements.

The global bus 30 is shown in FIG. 3. The global bus 30 communicates with each of the PEs in the GPPA level 16. Bus 30 is provided in part by way of connectors 31 (FIG. 2) on each of the circuit boards 20 and thus corresponds to the backplane of the printed circuit boards. As a result, each GPPA PE 28 can communicate with each other. Each GPPA PE also can communicate with its associated array of ICP PEs 26 by way of an on-board bus 32. Likewise, each ICP PE 26 can communicate with its associated array of CAAPP PEs 24 by an on-chip bus 34. In such manner the host computer 18 is connected to each PEs of the different levels so that a command over the global bus 30 can be directed to any of the PEs. For example, it would be possible for each ICP PE to be requesting different information from its local 8×8 CAAPP PEs. If all CAAPP PEs were responding to a central controller, this would have to be done serially thereby unduly increasing processing times in many instances.

Figure 16:
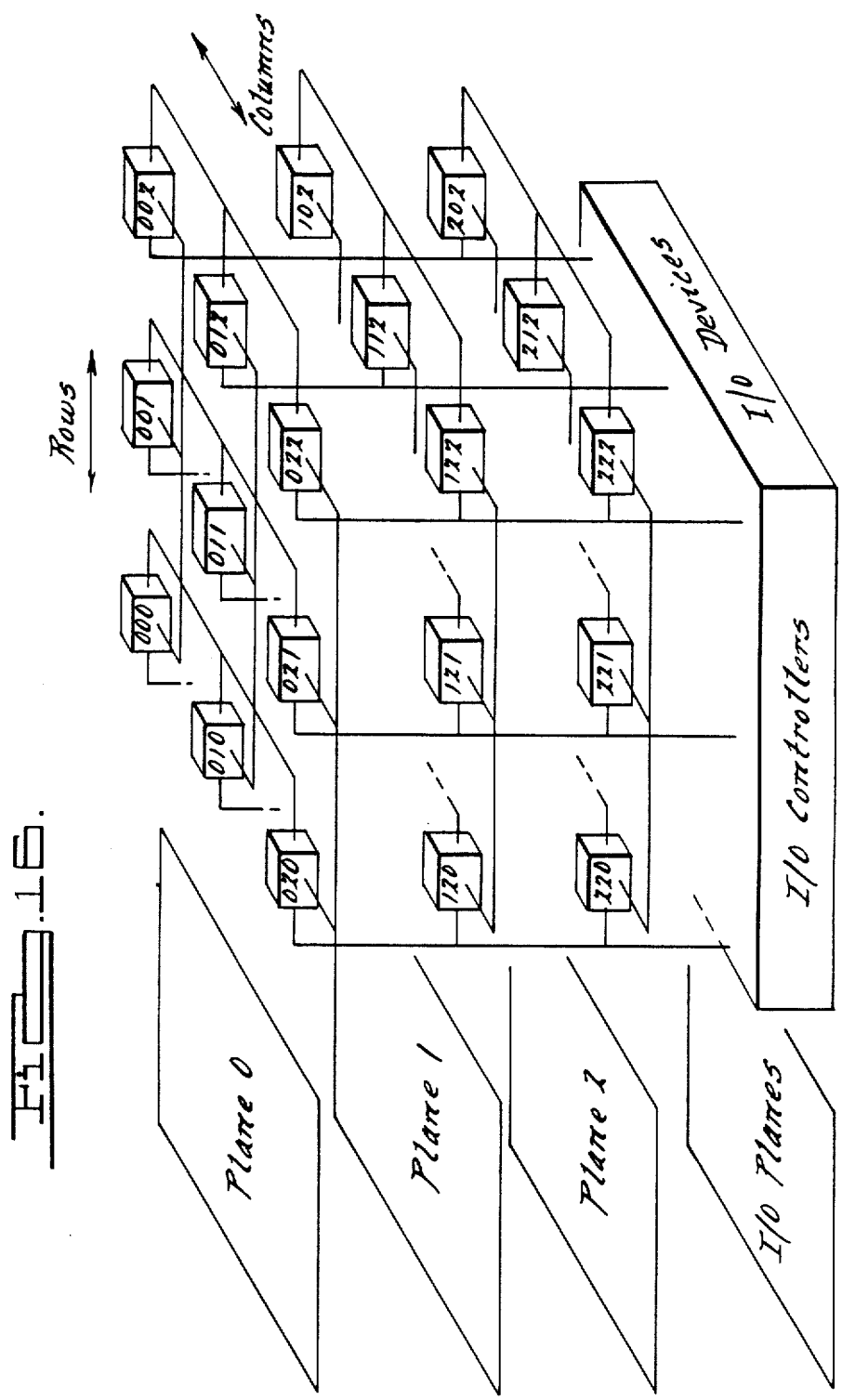
FIG. 16 is a schematic diagram of one embodiment of a bused cube configuration for connecting processing elements of a given level.

With this organization of the image understanding machine 10 of the present invention, various levels are available for processing data depending upon the granularity of the problem. In addition there is a parallel connection between each level to maximize communication rates between arrays of PEs. As noted above, communication between PEs within a level is satisfied by a nearest neighbor mesh at the CAAPP and ICP level with a 4×4×4 bused cube connection at the GPPA level. By "bused cube connection" it is meant that each GPPA PE is connected to three buses and each bus has up to four PEs. FIG. 16 illustrates a 3×3×3 bused cube configuration with each bus having up to three PEs. Implementation in this manner is straight forward because the machine of the present invention is based upon only two integrated circuit chip types: one for the combined CAAPP and ICP levels and one for the GPPA.

In the following Section B a description of a symbolic pixel array is provided which illustrates how the IU machine 10 of the present invention can be used both as a blackboard for reasoning about things (e.g., objects found in a scene), and as a tool for focus of attention processing. In Section C there is described in more detail the use of microcoded instruction queues which are introduced to minimize global bus traffic while ensuring that all processing levels are maximally active. These microcoded instruction queues permit the GPPA PEs to evoke a long series of machine instructions to the CAAPP and ICP level processors with as few as one "macro" instruction. Section D describes an improved dual-ported memory design for the CAAPP PEs which allows the CAAPP PEs to be used as a sort of intelligent memory residing in the physical system address space. This allows the controller (e.g., its associated GPPA PE) to access the memory of the CAAPP PE when it is busy processing data. The details and layouts of circuit components of the integrated circuit chip 22 are also described in Section D. Section E provides a specific example illustrating the operation of the IU machine 10 of the present invention. Finally, Section F provides a description of the improvement of the present invention where unique labels are applied to segmented regions in the image.

B. Symbolic Pixel Array

The spatial blackboard plays an important role in the translation of raw imagery into discrete identified objects. It is capable of representing information at both the pixel level and the object level without loss of the relationship between scene objects and the pixels from which they originated. The symbolic pixel array is a data structure introduced to satisfy the need for this kind of blackboard representation (e.g., Payton, "A Symbolic Pixel Array for Representation of Spatial Knowledge," *Proceedings of the Third Annual International Phoenix Conference on Computers and Communications,* 1984). The symbolic pixel array makes use of separate representations for scalar properties and scene objects. Scalar properties such as intensities are represented by numeric arrays the size of the image. Scene objects are represented with binary masks, which identify where in the image each scene object is thought to exist.

One obvious disadvantage of using image size binary masks to represent each small object in an image is the potentially large memory that would be required. It has been suggested to replace the binary mask with a structure called a virtual array. This minimizes memory use by making use of the concept of an offset for each object. The binary mask uses only enough memory to hold the smallest possible binary array necessary to represent an object. However, the virtual array not only adds overhead, but also makes it difficult to control simultaneously multiple objects of the same class randomly distributed in the image using parallel processors.

Figure 4A:
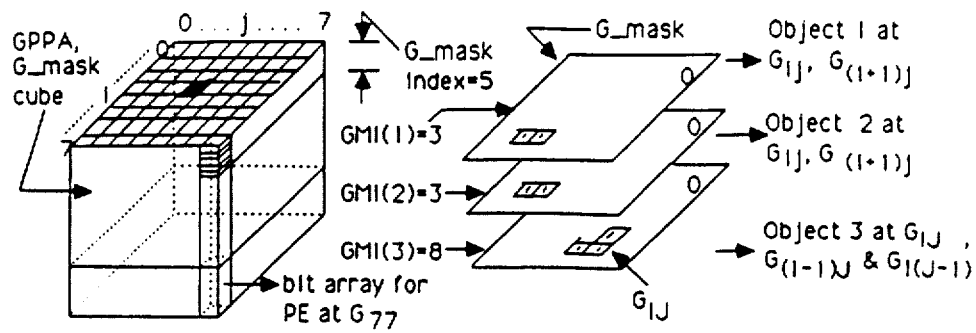
FIG. 4(a–c) is a diagrammatic view helpful in understanding binary mask representations of objects in the machine.
Figure 4B:
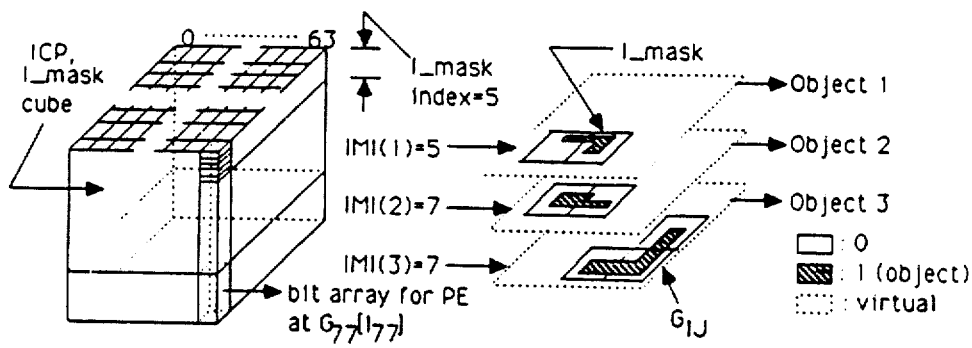
Figure 4C:
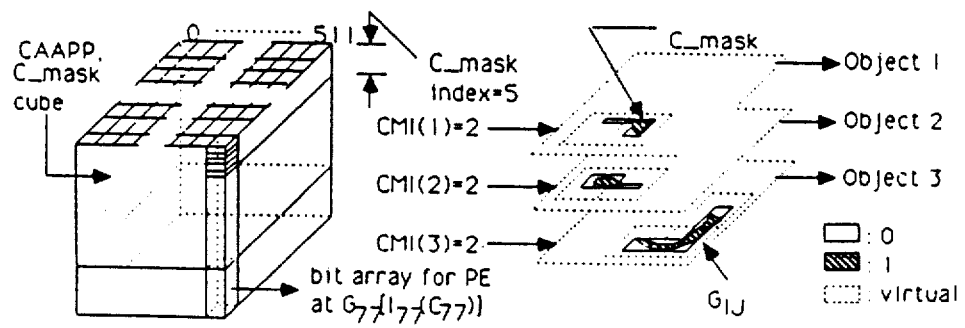

With the hierarchical architecture of the present invention, it is possible to replace the virtual array with a structure called Hierarchical Symbolic Pixel Array (HSPA). In HSPA, each object has three levels of binary mask representations. They are G_mask, I_mask, and C_mask, corresponding to processor levels at GPPA, ICP, and CAAPP, respectively. Each binary bit of the mask corresponds to one PE at that level. The content of the bit at any level is obtained by a "some/none" test to the 8×8 PEs on the level beneath it. A "some/none" test is the wired "OR" of the bit contents of the 8×8 PEs, i.e., if one or more of the PEs contain a logical 1, then the some/none test result will be a logical 1. A value of one indicates a portion of the object resides in the subimage (sector) corresponding to that PE. The bit position within a bit array for a given PE is called the mask index. The collection of these bit arrays is called the mask cube. (FIG. 4). For example, if the I_mask index (IMI) for an object A is equal to 3, (i.e., IMI(A)=3), then the corresponding binary mask of the ICP level representation resides somewhere in the third layer of the I_mask cube. In this embodiment, the layer sizes at GPPA, ICP, and CAAPP are 64, 4097 and 512×512 bits, respectively. The mask bit at each level controls the consumption of 8×8 bits of memory on the level beneath it (e.g. 1=consumption, 0=none). In other words, the smallest possible binary mask needed to represent an object at any level is always a multiple of 64 (i.e., 8×8). FIG. 4 illustrates the HSPA representations for three objects. Object 1 consumes the third layer of the G_mask cube (i.e., GMI(1)=3, mask size=64 bits). Since only two G_mask bits are set to 1 at Gij and G(i+1)j, (i.e. object 1 resides in subimage sectors corresponding to Gij, G(i+1)j ), it occupies 128 (i.e. 2×64) bits at the fifth layer of the I_mask cube, with the number of bits being set in the I_mask equal to b1 (IMI(1)=5, I_mask size(1)=128 bits). Consequently, the mask at the CAAPP level has a size of 8×8×b1, and resides in the second layer of the C_mask cube (CMI(1)=2, C_mask size(1)=64b1). Usually, the three mask indices are different for an object.

Object 2 has the same G_mask as Object 1 (i.e., GMI(1)=GMI(2)); therefore, it is possible to accommodate more objects than the number of layers in the G_mask cube. As a result, the I_mask of Object 2 must occupy a different cube layer from that of Object 1. It may reside in the same layer as that of Object 3 because their G_masks are non-overlapping. Similarly, the C_masks of all three objects may occupy the same mask layer, based on the non-overlapping of their corresponding I_masks (e.g. CMI(1)=CMI(2)=CMI(3)=2, as shown in FIG. 4).

Two objects A & B may have overlapping C_masks since some pixels can belong to two different hypotheses associated with Objects A & B. In this case, their CMIs have to be different. Therefore, the mask cubes enable individual pixels to hold multiple hypotheses.

In addition to the conventional row/column addressing mode, the board/chip select can be controlled (value of mask bit: 1=select, 0=disabled). This facilitates focus of attention processing. For example, to process Object 3 (e.g., runway) only, the controller will specify G_mask and I_mask indices (GMI(3) & IMI(3)) in the address bus, and send CAAPP a command through the data bus, which will load the CAAPP activity bit (A register) with C_mask. Any subsequent CAAPP instructions will only affect Object 3. In summary, any object can be uniquely accessed/processed by specifying its corresponding three mask indices.

To control simultaneously multiple objects of the same class dispersed in the image, the HSPA can be easily created to represent the union of them. The HSPA of the union can then be treated as a single entity as far as the controller is concerned, without destroying the original identities of the individual objects.

C. Microcoded Instruction Queues

One obvious disadvantage of using the above SIMD (which stands for single instruction multiple data) CAAPP architecture is the potentially large waste of inactive processor arrays. At worse, most objects will cross the physical board/chip boundaries, causing difficulties in synchronizing the multiple local controllers for concurrently processing different objects (e.g., one set of PEs processing a runway while another set processes buildings). With the previous CAAPP architecture, if several objects touch the subimage sector of a given board (GPPA PE), they would all have to be sequentially processed. Thus, CAAPP processing efficiency would be decreased. At every clock cycle, the GPPA PE could issue only one command to PEs associated with just one object. As a result, other CAAPP PEs associated with other objects have to be idled. Fortunately, it is possible to take advantage of the fact that CAAPP is a bit-serial machine and most image processing routines require byte or word parallel operation. This is done by using instruction queues with microcoding to mimic a MIMD (which stands for multiple instruction multiple data) architecture instead of a bit-serial operation.

The idea of instruction queues with microcoding is to have different objects or sets of PEs which receive in turn small sets of byte or word instructions from the local controller sequentially, but which internally expand concurrently the assembly level word instruction into several microcode level bit-serial instructions. For example, one assembly level instruction from the local controller for multiplication of two words will keep an object, i.e., the corresponding CAAPP array, busy for at least 256 clock cycles by executing 256 bit-serial operations. This way, the local controller is able to take advantage of the microcoded routines within an object, i.e., on-chip microprograms, by issuing several other assembly level instructions to PEs associated with other objects. Therefore, all the objects within a board are maximally active.

To support this kind of virtual MIMD architecture, a board/chip select controlled by the G_mask and I_mask of HSPA is provided. Instead of enabling or disabling activities of the PE array, the board/chip select is used to control whether or not to load the current assembly instruction from the data bus into the object (i.e., the corresponding PEs) instruction queues. Nevertheless, the enable/disable of the processor array can still be done implicitly through the status of the instruction queue. If the queue is empty, the PEs are idle and thus disabled; they are enabled through loading the instructions into the queue on the ICP/CAAPP chip. By specifying a unique set of HSPA mask indices, the instruction queue of every object can be loaded in turn with a different set of programs. Therefore, virtual MIMD operation can be achieved. Since each object cannot fetch its own instruction by using a program counter, it is not a true MIMD architecture in the conventional sense.

It should be noted that the combined features of HSPA and microcoded instruction queues make the physical board/chip boundaries invisible to the object processing routine. In other words, the scene object can assume any shape and size without concern over local controller synchronization. Thus, the G_mask controls the synchronization of GPPA PEs, and the I_mask controls the loading of instruction queues at each object chip. Finally, microcoded queues ensure that all object processors are running concurrently with different programs. Therefore, original local controller performance can be improved by a factor on n, if n objects touch the sector corresponding to that local controller. Furthermore, if one small object touches four adjacent local controllers (GPPA PEs), it will not tie down the running of 4n object programs; instead it requires only one unit of time slice. Thus, if on average ten objects touch a given GPPA board, then the ideal system performance can be improved by a factor of 40.

Time slicing plays an important role in synchronizing various local controllers within an object. If two objects A & B have overlapping G_masks, then their time slice indices (TSI) have to be different. Assume every time frame has ten clock cycles, and TSI(A)=1, TSI(B)=10. Then, at the first clock cycle of every time frame, all the local controllers associated with Object A will issue one instruction to the corresponding portion of Object A if the queue is not full. Object B will receive instruction at the tenth (last) clock cycle. If Objects A & B have non-overlapping G_masks, then they can have the same TSI. For objects crossing board (GPPA PE) boundaries, time slicing ensures that all portions of an object receive the same instruction at the same time. Suitable hardware can be used to dynamically select the TSI for each object at run time.

Time slicing also resolves the contentions among multiple objects having the same G-masks for global resources such as response counts and some/none tests. In the currently preferred embodiment, two queues are assigned for each time slice index at the GPPA level; while the some/none test result will determine which queue will be active.

Histogramming techniques are used extensively by modern segmentation algorithms (see, e.g., Reynolds, Irwin, Hanson and Riseman, "Hierarchical Knowledge-directed Object Extraction Using a Combined Region and Line Representation," *Proceedings of Image Understanding Workshop*, 1984). The scarcity of HOST level global response count resources could be a serious bottleneck. A known CAAPP had only one HOST level global adder tree, which accumulated all response counts from 64 boards (GPPA PEs), and one SOME/NONE test circuit. Ideally, the number of HOST level global Response Count and Some/None (HRCSN) circuits should be equal to the number of layers in the G_mask cube. Instead of driving one HRCSN circuit, the response counts from every GPPA board will drive multiple circuits. Thus, objects having different G_masks may perform histogram operations concurrently. The GMI determines which HRCSN circuit will be used for a given object. All the HRCSN circuits and its 64 inputs are the same. However, their counting results are different and based on the corresponding G_mask to determine the subset of boards whose response counts will be accumulated by the circuit (mask bit: 1=accumulate, 0=none). Since not all the objects will perform the histogramming at the same time, the number of HRCSN circuits can be smaller than the number of G_mask layers. The optimal number can be determined by simulation. The Response Count Index (RCI) is used to determine which HRCSN circuit will be allocated to a given object. In summary, to successfully process a given object, five indices are required; there are three HSPA mask indices, a time slice index and a response count index.

The addition of instruction queues and microprogram storage does not cost a lot in terms of system complexity or size (e.g. on chip real estate).

D. ICP/CAAPP Integrated Circuit Chip Design with Dual-Ported Memory

To ensure that all processors are actively processing data, data must be ready when needed. The present invention provides multiple dual-ported memory banks to allow CAAPP to work on one set of data in one memory bank, while local controllers are loading the next set of data to be processed into another memory bank. When the current bank is finished processing, a switch can make it accessible by the local controller. Therefore, a sufficient number of pins for address bus have been added to the ICP/CAAPP chip design to support use of ICP/CAAPP PEs as intelligent memories, residing in the physical system address space. This addition is also needed to support the HSPA scheme of chip select by specifying mask indices on the address bus. As a bonus, the microprogram storage for ICP/CAAPP PEs and control functions other than HSPA mask indices can also be accessed through the system address space. The CAAPP instruction format has 32 pins and occupies the system 32-bit data bus.

In the course of mapping large window convolution algorithms onto the HIUM, it was determined that three memory banks for each CAAPP PE are sufficient. Furthermore, if each memory bank has its own address register with up/down counter capability, then it can also be regarded as an operand stack and increase immediately the CAAPP PE performance by a factor of 3. The address register can be treated as a stack pointer. Usually, image processing operation calls for two operands from the memory and saves the results in a third memory position. It takes one of the known CAAPP three instructions to access three different memory locations due to the constraint of the size of the address field in instruction format, which can only specify one memory bit location. With the new operand stacks, the two operand bits can be simply popped off the stacks, and the result can be saved onto the third bank at a bit location specified by the address field of the CAAPP instruction. It takes only one instruction to do this for all but the first bit of byte/word operands, and thus achieves three times performance improvement. The first bit of the word, however, still requires three instructions to compute such that the stack pointers/address registers can be initialized as a side effect. FIG. 5 shows a preferred instruction format. The CAAPP assembler will take care of how to optimally assign various variables to appropriate banks so that operands and result reside in different banks as much as possible and free programmers of the chores.

Figure 13:
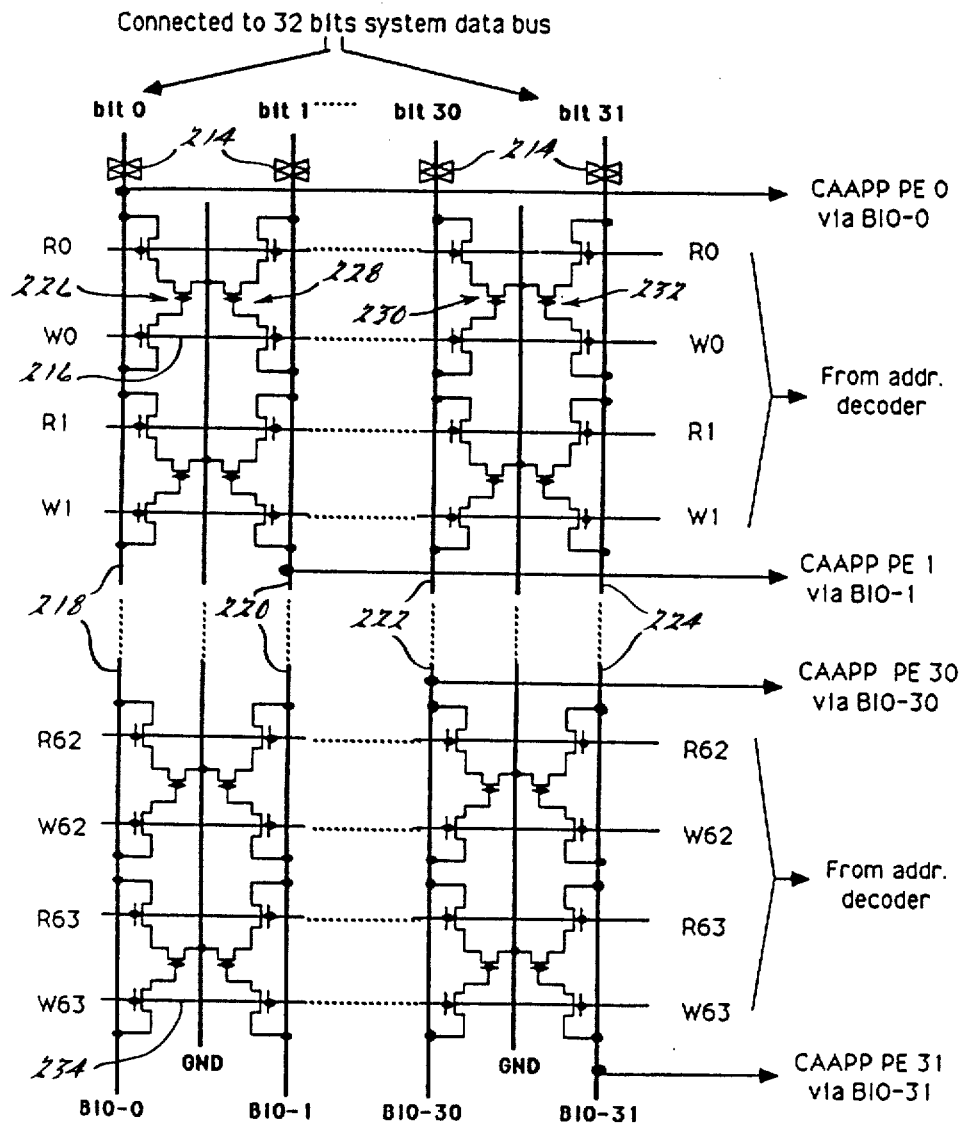
FIG. 13 is a schematic circuit diagram of a dual-ported memory layout for a first level processing element.
Figure 14:
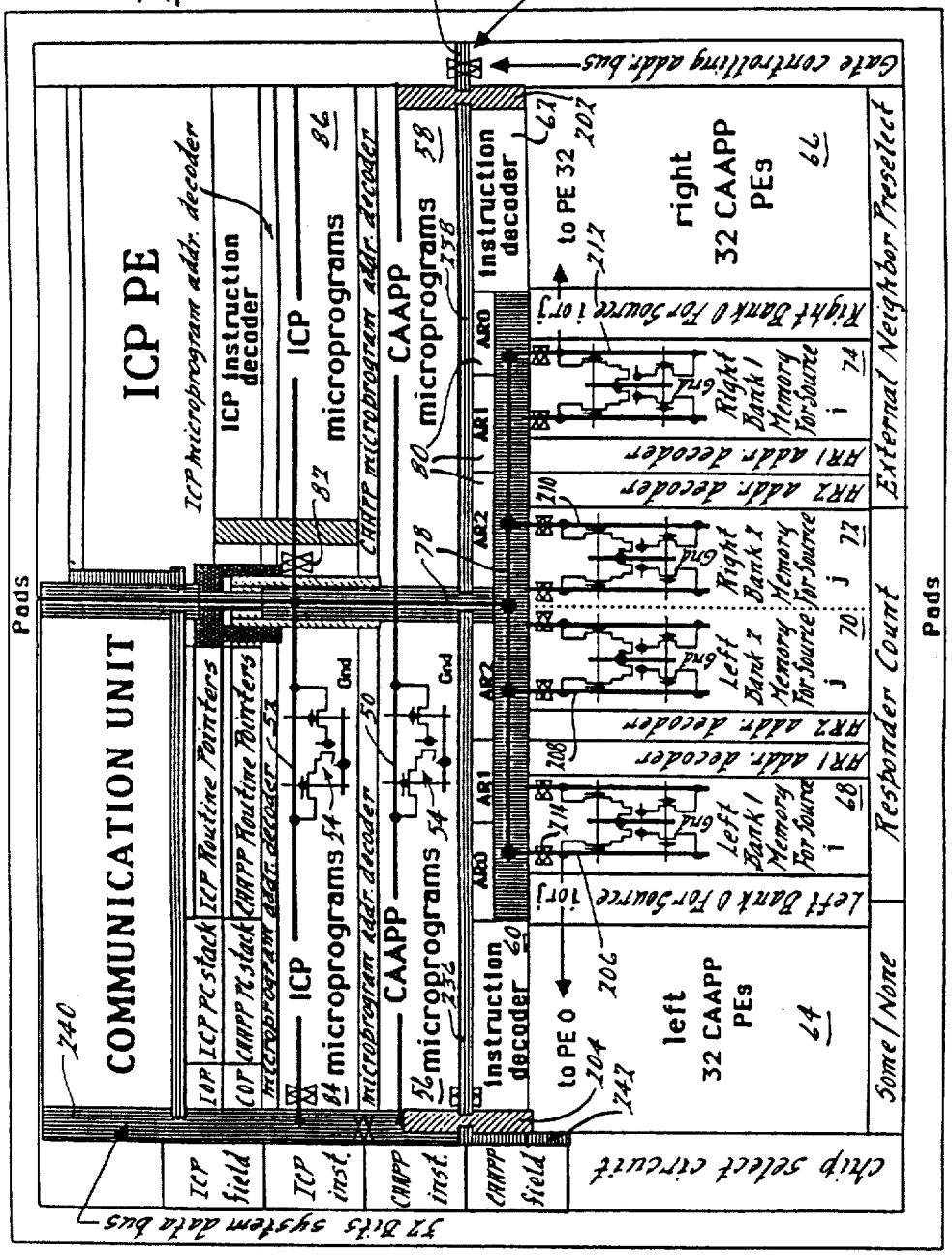
FIG. 14 is a diagrammatic view illustrating an integrated circuit chip design layout for a combination of first and second level processing elements.

With particular attention to FIGS. 13-14, the design of the present invention concentrates on supporting the new features of HIUM but does not cost a lot in terms of system complexity or size. Careful attention is paid to the required on-chip real estate used and the regularity of layout. The major savings are achieved by the multiple uses of BIO (input/output bus) lines (e.g., 50,52 in FIG. 14) of three-transistor RAM (random access memory) cells generally designated by the numeral 54. Thus, each cell is capable of storing a binary value. The BIO lines 50 serve both as the output line for CAAPP microroutines from store 56,58 and as the interconnection via 202, 204 between two instruction decoders 60,62 of two 32 CAAPP PE stacks 64,66 on two extreme sides of the chip. The ICP microprogram storage RAM's BIO lines 52 have three purposes. These function as part of the memory structure, output lines of ICP microroutines, and as a data bus for access by HOST/GPPA/ICP of CAAPP PE memories. The BIO lines of CAAPP memory banks 1 & 2 are used both by CAAPP PEs and higher level PEs.

FIG. 13 shows the schematic for the dual-ported memory bank which corresponds to banks 68,70,72, and 74 in FIG. 14. When the gates 214 are turned on, the BIO lines can be used by the GPPA/ICP to access one bit from each CAAPP PE. For example, if write line W0 216 is active, then BIO line 218 is used for writing into the bit 0 RAM cell 226 of CAAPP PE 0. Similarly, bit 0 RAM cell 228 of PE 1, cell 230 of PE 30 and cell 232 of PE 31 will use BIO lines 220, 222, and 224, respectively. To update the bit 63 RAM cells of all CAAPP PEs, the write line W63 234 will be activated. BIO line 218 corresponds to BIO lines 206 and 208 in FIG. 14, and is connected, as shown, to the bit 0 of system data bus 240 via line 52 and 78 or to the CAAPP PE 0. However, if the gates 214 are turned off, the memory bank will be disconnected from the system data bus. As a result, the BIO lines can be used by the CAAPP PE to access one bit from the memory bank. The address registers 80 for each bank can be loaded from the on-chip address bus 236, 238 which is connected to either the system data bus 240 via the address field 242 of the CAAPP instruction or directly to the system address bus 244, such that the memory bank can reside in physical address space. To facilitate flexibility for the system to access one word from a given PE, or one bit from each PE, data cache is included in each GPPA PE board for data format transformation. The block transfer size is equal to 32 words, and access of the current block will automatically initiate the next block transfer so that when the system has finished accessing the current block, the next block data will be ready to be accessed. The sequence of the next block is under software control, and can be stored in the control registers of the data cache.

Figure 15:
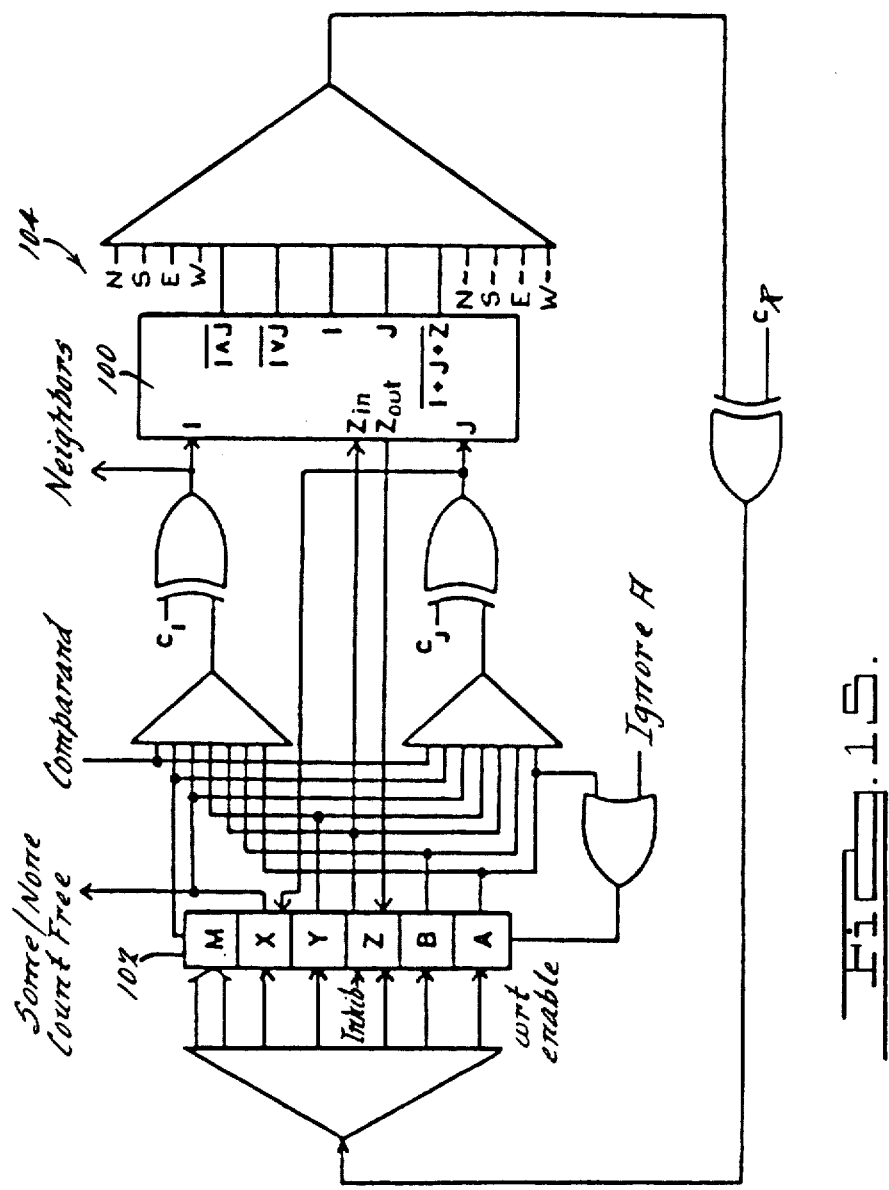
FIG. 15 is a schematic diagram of an example first level processing element.

The floor plan for the chip is shown in FIG. 14. As can be seen here, the BIO lines 50 of CAAPP microprograms will interconnect two instruction decoders 60,62. The BIO lines 52 of ICP microprograms store 84 will connect the BIO lines 206, 208, 210 and 212 of bank 1 and bank 2 of the CAAPP PE stacks via line 78 and thus make them accessible by the out-chip command; it also allows an on-chip ICP PE to access those banks under the control of separate ICP microprogram store 86 when the gate 82 is turned off. A functional diagram of a suitable CAAPP PE is shown in FIG. 15. The details of the circuitry for this PE is disclosed in more detail in the paper by Levitan et al., "Signal to Symbols: Unblocking the Vision Communications/Control Bottleneck", VLSI Signal Processing published 1984 by IEEE PRESS. Briefly, each CAAPP PE is a bit-serial processor consisting of a bit-serial arithmetic logic unit (ALU) 100, a memory section generally designated by the numeral 102 which can correspond with the memory banks described above in connection with the chip layout. Various local and global interconnection hardware is provided, the global interconnection being represented by the north, south, east and west mesh interconnections bearing reference numeral 104. Several single bit registers are provided. Register X is a primary accumulator bit which is also used for communications. Register Y stores a second accumulator bit. Register Z stores the carry bit which is used for arithmetic operations. Register A can be used to store an activity bit which can be employed for enabling and disabling this particular PE on any given operation. Register B is used as a secondary activity bit for temporary storage of activity "flags". An improved and presently preferred version of the CAAPP PE is disclosed in Section F and the figures referred to therein.

E. Specific Example of Machine Operation

In this section, it is shown how an expert system for object recognition in natural scenes is mapped onto the HIUM (see, e.g., Lawton, Levitan, Weems, Riseman, Hanson, "Iconic to Symbolic Processing Using a Content Addressable Array Parallel Processor," *Proceedings of Image Understanding Workshop*, 1984). We start with the initial set of regions produced by general segmentation algorithms disclosed, for example, in the articles noted above which are hereby incorporated by reference. Unconditionally, each region is initially classified as a scene object which is the most generic object class that subsumes all object classes in the most generic object class that subsumes all object classes in the image domain. Note that the classification of a region as a scene object does not involve any ambiguities or uncertainties. As the inference process proceeds, each object is hypothesized as each of its subclasses, and evidence is gathered to confirm or refute these hypotheses. The split/merge operation may also be performed by using the semantically directed feedback for resegmentation. This cycle of hypothesis generation, evidence gathering, and confirmation or refutation is repeated for each confirmed hypothesis until each region is classified as a terminal object class of the object hierarchy, or no further subclassification is possible because of low confidence for the current classification.

In the end, the symbolic description of the entire scene is constructed and stored in the ICP/CAAPP PE memories in the form of a semantic network with each node represented by one or more instance frames. These memories are referred to as SHORT-TERM MEMORIES (STM). The scalar properties and binary masked scene objects are stored in the CAAPP memories. The instance of an object frame and its associated slot values, super/subclass and member/component relationship pointers are stored in the ICP memories. The HOST/GPPA memories are referred to as LONG-TERM MEMORIES (LTM). Various kinds of knowledge, such as contextual, domain specific, and picture specific knowledge are stored in the LTM. There are two roles played by GPPA PEs: local controller for ICP/CAAPP, and domain "expert" for a particular set of objects. As a local controller, GPPA stores primitive image operation routines such as convolution, histogramming, and so on for the CAAPP and primitive rule matching routines for ICP. The HOST will store complex image processing routines in terms of GPPA primitive operations if the GPPA is constrained by memory size. As a domain expert, GPPA will be equipped with object models, knowing its stable states and the most likely segmentation strategy, etc.; it also performs housekeeping for sets of objects of the same class, as will be seen in the following example.

Figure 7:
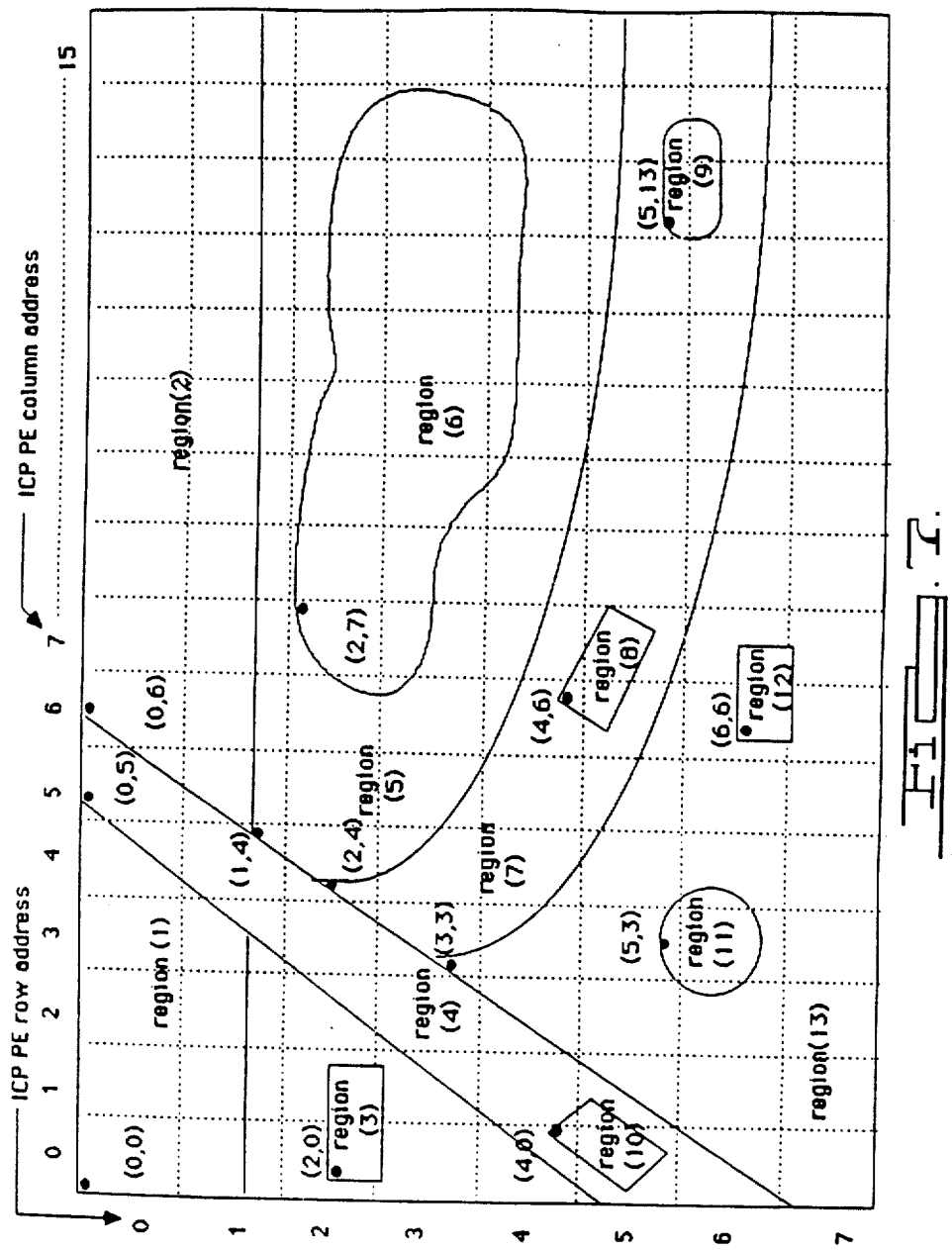

Using the hypothetical scene in FIG. 6, the initial general region segmentation result would be as shown in FIG. 7. For the sake of simplicity, it is assumed that the image size is $64 \times 128$ and occupies two GppA boards at (0,0) and (0,1). The row and column address ranges for ICP and CAAPP are (0–7, 0–15) and (0–63, 0–127), respectively. To extract connected components, the coordinates of the cells in the region can be used to determine the component labels (see, e.g., D. Lawton, S. Levitan, C. Weems, E. Riseman, A. Hanson, "Iconic to Symbolic Processing Using a Content Addressable Array Parallel Processor," *Proceedings of Image Understanding Workshop*, October 1984, P316–332). The particular region cell having the least row,col component is called the dominant region cell. Section F describes in more detail how this region "label" is applied pursuant to the present invention. In HIUM, the ICP PE corresponding to this dominant CAAPP cell is where the instance frame, which contains various attributes of this scene object, is stored. FIG. 7 shows the coordinates of those ICP PEs which contain the instance frame with empty slots. To fill these slots, it is suggested to step sequentially through each extracted scene object using the Find First Responder operation of the CAAPP. By broadcasting the region label, it is straightforward to compute simple region properties such as area, perimeter length, minimum bounding rectangle, and so forth for the corresponding region. The HSPA representations for an object are also generated at this stage by latching the some/none test results at each appropriate level. The corresponding HSPA mask indices are stored in the slots of individual instance frames as part of attribute lists.

Figure 8A:
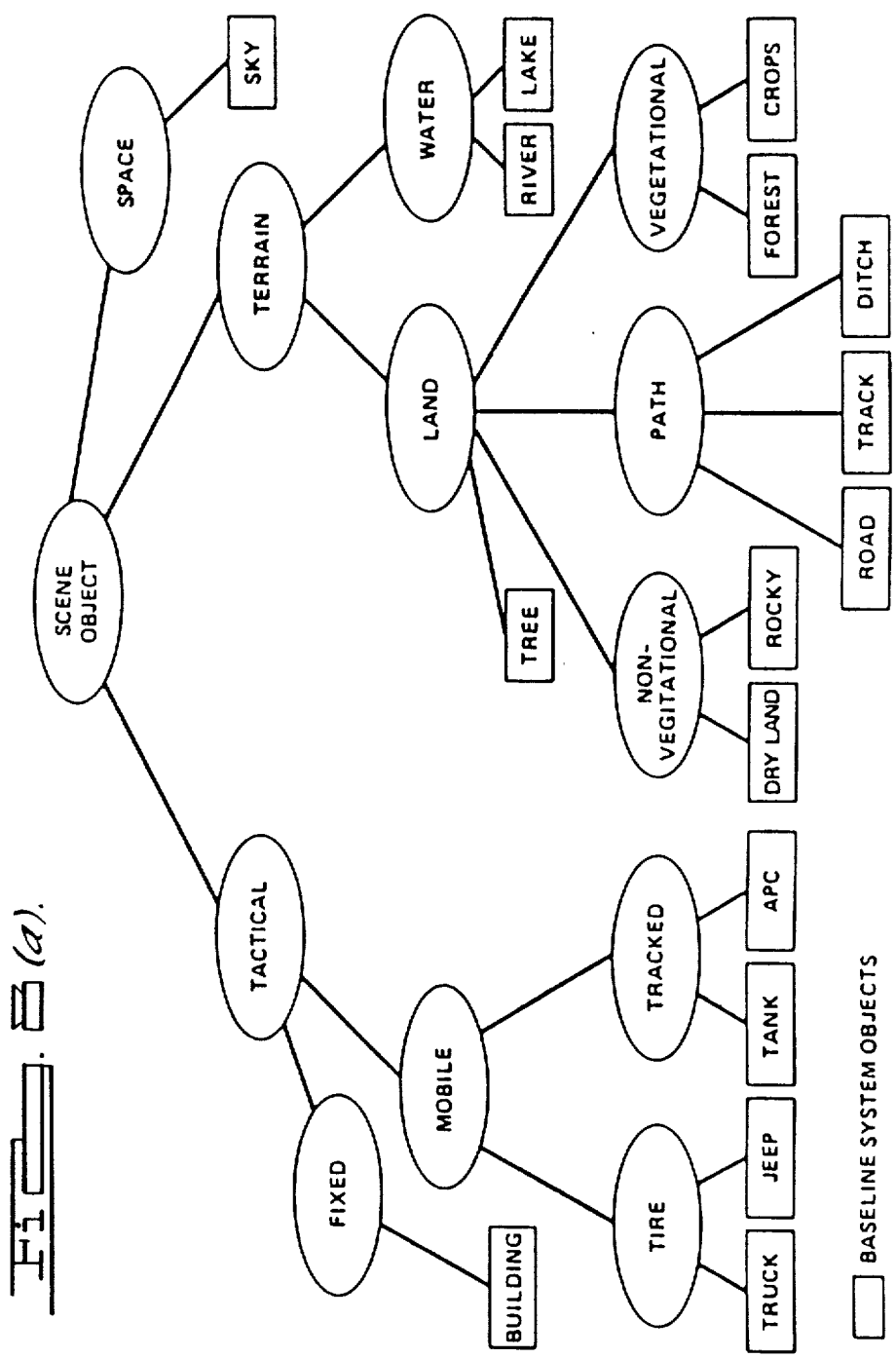

As the inference process proceeds, the "established" objects will attempt to generate hypotheses to subclassify themselves into more specific classes based on the object hierarchy shown in FIG. 8(a). In this hierarchy, the scene object is automatically assumed "established"; therefore, its three subclassification hypotheses, tactical, terrain and space, are generated accordingly. To achieve efficiency, we may proceed with two computational steps. In the first step, hypotheses are filtered by computationally simple tests. Highly unlikely hypotheses are quickly eliminated by simple binary, true/false, tests. Only the hypotheses that pass this screening test will receive further evaluation. In the second step, each piece of evidence is carefully weighed, integrated into the existing body of evidence, and confidence is updated.

Consider the first computational step in HIUM. FIG. 9 shows that each of the 13 scene object frames, before the screening test, contains three NIL pointers corresponding to three hypotheses generated: tact (tactical), terr (terrain), and space. FIG. 10 shows that after a screening test for tactical objects, five tactical hypotheses are successfully instantiated, as indicated by the values stored in the "tact" pointer slots which point to the corresponding empty tactical object instance frames residing in the neighboring physical ICP PEs. The "tact" pointer slots of other scene objects will remain NIL to manifest the fact that even though the hypotheses are generated but not instantiated, through reserving ICP PEs for storage due to failure of the screening test. For example, at the upper left corner in FIG. 10, the "tact" pointer of Scene Object 3 contains (2,1) and points to instance frame which has the identification of "tactical-3" at the neighboring ICP PE (4). Note that Scene Object 3, which is a building in FIG. 6, relates to Region 3 in FIG. 9. Even though only the forward pointer is shown, all the links in the object hierarchy are doubly linked. For the sake of simplicity, only objects which touch the board (0,0) will be shown in the figures.

There are two ways to obtain the new pointer for reserving an empty instance frame. The first is through the HOST/GPPA, which may perform garbage collection and maintain free storage lists. This approach is most effective when the ICP array is highly populated. The second method is through message waves sent concurrently/locally by all objects passing the screen test. This approach is very efficient when most of the neighboring ICP PEs are free. To see how the first approach works, consider the previous five tactical hypotheses. At the beginning, the HOST, (or a GPPA PE when acting as a domain expert at the lower levels of the object hierarchy, by sending the command through HOST), sent screening tests to all 13 scene objects, only five of which passed. The HOST steps through each of them using the Find First Responder operation, and delivers one pointer extracted from the free storage list to the corresponding "tact" pointer slot. Before proceeding to the second computational step, the HOST will filter all 13 objects by terrain and space screening tests in case multiple hypotheses for an object are necessary.

To establish an instantiated hypothesis, evidence should be gathered and weighed in the second computational step. In addition to delivering empty frame pointers to five potential tactical objects, the HOST will gather the corresponding HSPA mask indices and represent the union of them. This information will be passed to the appropriate domain expert to control all five objects simultaneously if possible.

Assuming HOST, GPPA PE(0,0), and GPPA PE(0,1) are experts on space, terrain, and tactical, respectively, then GPPA PE(0,0) will receive relevant information about four instantiated terrain hypotheses and supervise the execution of image processing routines on four dispersed objects (i.e., the corresponding CAAPP PEs), through HOST by sending routine pointers. The operations performed on tactical and terrain objects can be concurrent if their HSPA masks are non-overlapping. Unfortunately, in FIG. 10 Scene Object 11 (tree) is instantiated both as a tactical and a terrain object as can be seen by the non NIL pointers. By performing set difference operations on HSPA masks, GPPA PE (0,1) will be able to initiate activity on the other four tactical objects while doing the housekeeping chores for Object 11 and waiting for its resources to be free. With just one object, there is a better chance to find non-overlapping HSPA masks next time around. When the image processing on the four tactical objects is finished the results can be sent, using the scene object pointer, to the destination slot in the tactical instance frame, or further down the hierarchy as more subclassification is instantiated. All four objects can do this concurrently or pipelined, depending on the availability of concurrently or pipelined, depending on the availability of global resources, to obtain the result. Since the processing routines for terrain and tactical objects are different, their results will be sent at different times. Consequently, there is less chance for contention for the ICP packet switching resource. It should be noted that HSPA mask indices are the bridge between the nonspatial symbolic representation of instance frames, which are linked through pointers, and the spatial scene objects where the physical location and image scalar properties are important for image processing.

Figure 8B:
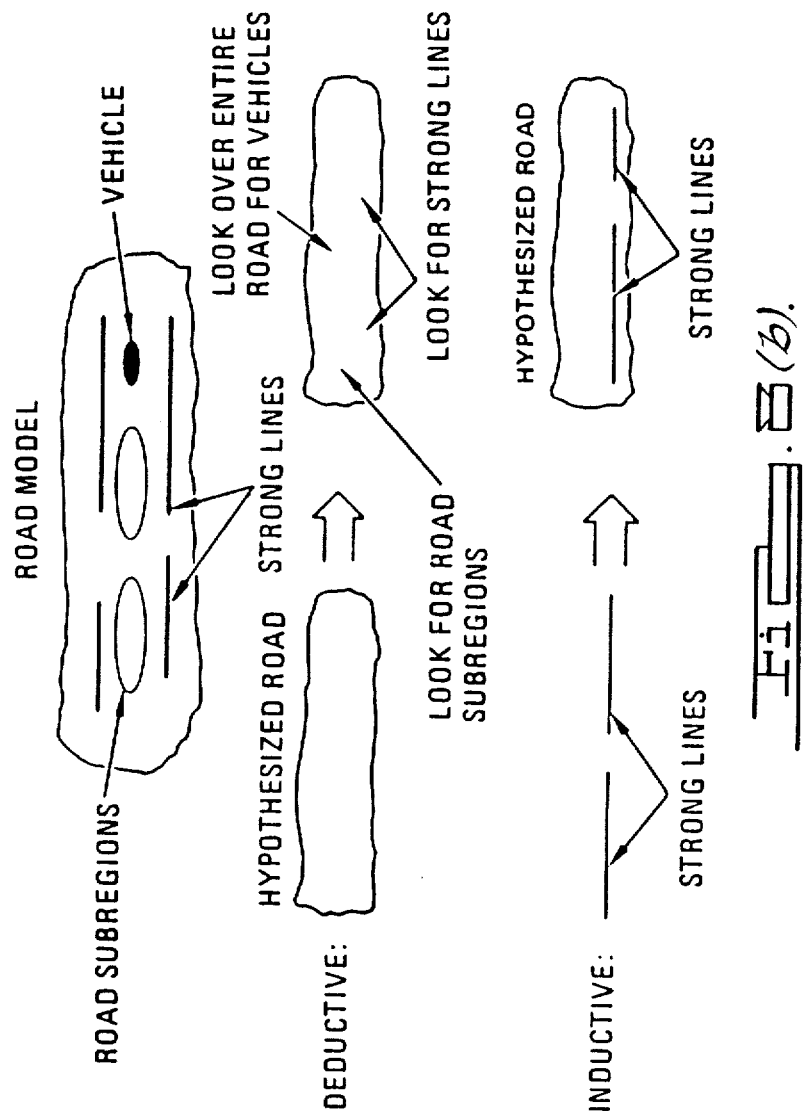

To gather evidence for a given hypothesis, in part, there are two slots: ded (deductive) and ind (inductive) in the tactical instance frame in FIG. 10, which store results of the deductive and inductive reasoning about context. In the corresponding slots in the model frame, the domain expert stores pointers to the deductive and inductive reasoning procedures in the HOST. FIG. 8(b) shows a road model and its corresponding deductive and inductive reasoning methods. It is referred to as model-driven reasoning, since these procedures may all be defined relative to the model itself; they may be tuned specifically to operate over a defined domain. After all the slots for a given instance frame are filled if possible, the confidence will be weighed by ICP/GPPA according to some rules. If the confidence score is low, the hypothesis will be discarded and the corresponding ICP PE storage space for the instance frame will be returned to the free storage space for the instance frame will be returned to the free storage list. The pointer slot of its superclass will be NILed. If the confidence score is high enough, then the instantiated hypothesis will be established. A new cycle of subclassification hypothesis will be generated. This is referred to as data-driven reasoning, due to new hypotheses being generated through evidence gathering. The ICP will perform complex symbolic processing, except when floating point operations are required for the computing confidence score. Since the ICP can access CAAPP memory, the CAAPP PE can be treated as a content addressable memory for the ICP when image processing operations are idling.

After a few cycles of hypothesis generation, Scene Object 10 at the middle left corner in FIG. 11 failed to be classified as a tactical object (tank in this case). Just as human beings would refuse to classify an object into a specific class unless sufficient information were available, the last instance frame of mobile-10 says "That is definitely a moving object but I don't know whether it is a tank or truck." (Pointers for "tire" and "tracked"

are NIL, meaning insufficient evidence for any further subclassification.) In other words, the sentence has a physical correspondence in the STM of ICP.

In part, the fact that mobile-10 is a moving object is strongly supported by the evidence that it has a wheel, as indicated by the value (5,2) in the "ded" pointer slot, which points to "wheel-14" instance frame at ICP PE (5,2), and was obtained through a deductive reasoning method as follows. The wheel hypothesis is first generated and the CAAPP image routine of "wheel finder" is then invoked. Since the routine is defined relative to the vehicle itself, it has been tuned to much higher sensitivity levels because of the reduced amount of misleading clutter within the domain of Object 10. The attributes list, including HSPA mask indices, of the newly segmented Region 14 is gathered and stored in the scene object instance frame at ICP PE (6,1). After passing the screening test for wheels, the hypothesis is instantiated by storing (5,2) in the "wheel" pointer slot of Scene Obj-14. The "wheel-14" instance frame is established by further processing. For example, based on the orientation of Mobile-10, the projection of the modeled wheel can be compared with the observed wheel. The pointer to the established wheel instance is returned to the "ded" pointer slot of Mobile-10 along with the confidence score of the wheel. Therefore, Mobile-10 can know its wheel location by retrieving HSPA mask indices through the pointer threads. In the end, the confidence score of Mobile-10 is further increased by the fact that it is on Road-4 as indicated by the "ind" pointer slot which has a value of (2,3) and points to Road-4 instance frame at ICP PE (2,3). (FIG. 6, FIG. 12) Consequently, Object-10 is definitely a moving object.

Scene Object 12 at the lower right corner in FIG. 11, is successfully classified as APC with appropriate pointer threads. If it is desired to find an APC in an image, simply broadcast "APC" t the ICP array, and ICP PE (7,3) will initiate backward tracing and reach the scene object instance frame at ICP PE (6,6). The HSPA mask indices (i.e., object physical location) will be retrieved along the way with other pertinent information required. It also contains multiple hypotheses for this object. FIG. 12 shows full semantic network representation for the scene. If tactical objects are of interest, all the corresponding ICP PEs will flag and retrieve physical locations. If closest tanks are of interest, all the tanks will initiate image processing, and the one closest to certain pixels will flag. This is possible due to the bridge role of HSPA between nonspatial and spatial information.

F. Region Labeling

Figure 17:
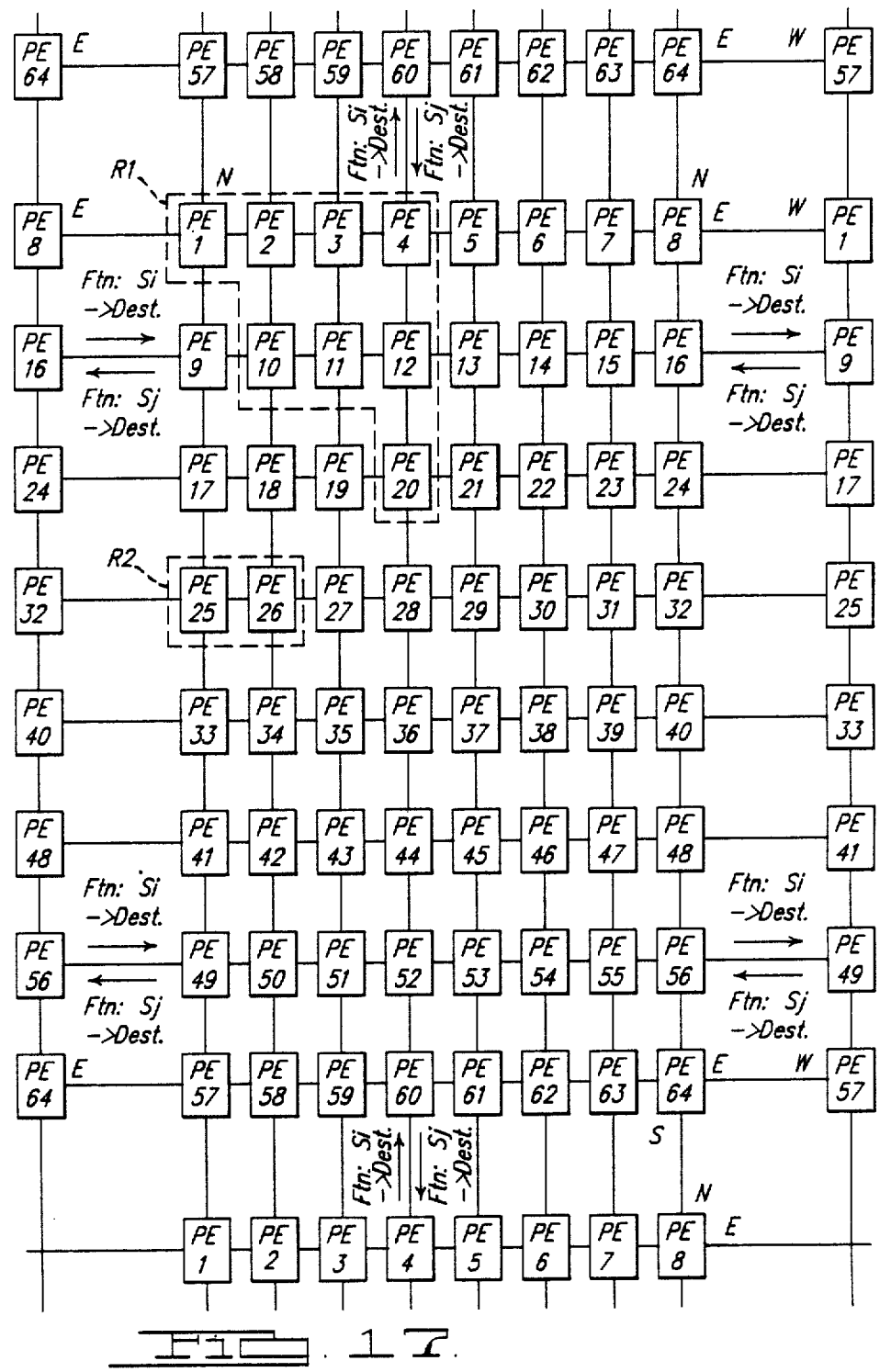
FIG. 17 schematically represents a mesh connected network of first-level processing elements.
Figure 18:
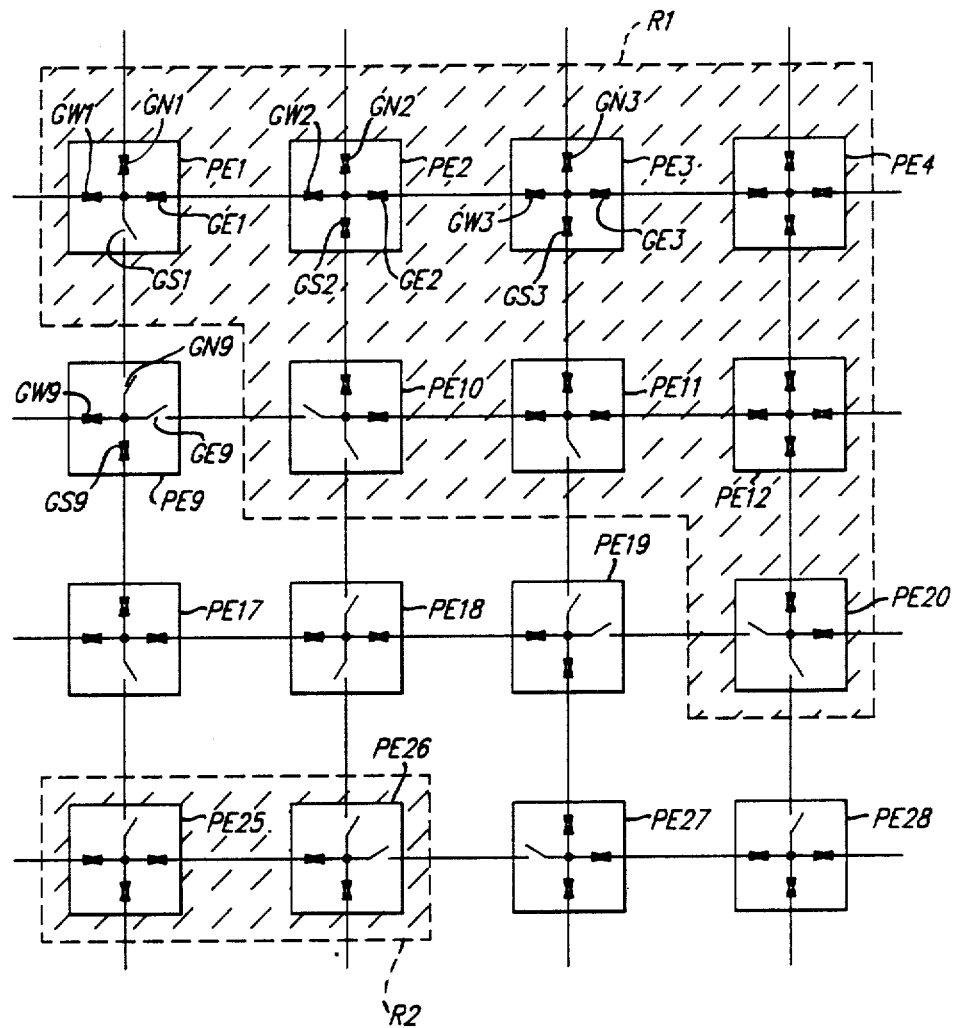
FIG. 18 symbolically represents an image having two regions as stored in the PEs, together with a representation of the gated connections between neighboring PEs.

Reference to FIG. 17 and 18 is useful in understanding the problem to be solved by way of the invention claimed in the above mentioned U.S. Ser. No. 013,481. To perform image processing functions, the binary image data is loaded into the CAAPP PEs such that each pixel is stored in the memory of one PE. FIG. 17 illustrates a mesh network showing how all of the CAAPP PEs are connected to their neighbors in the north (N), south (S), east (E) and west (W) directions. Assume, for example, that the image as stored in the PEs has certain segmented regions of connected pixels having the value of 1. Two of such regions R1 and R2 are illustrated schematically as the shaded areas in FIG. 18. The boxes in FIG. 18 represent individual PEs and, for simplicity's sake, they will be labeled with the same labelling as the PEs in FIG. 17. Note, also, that the regions R1 and R2 have been denoted by dotted lines in FIG. 17 to aid in further understanding. The problem to be solved is to provide a technique for applying unique labels to these regions such as regions R1 and R2.

Figure 19:
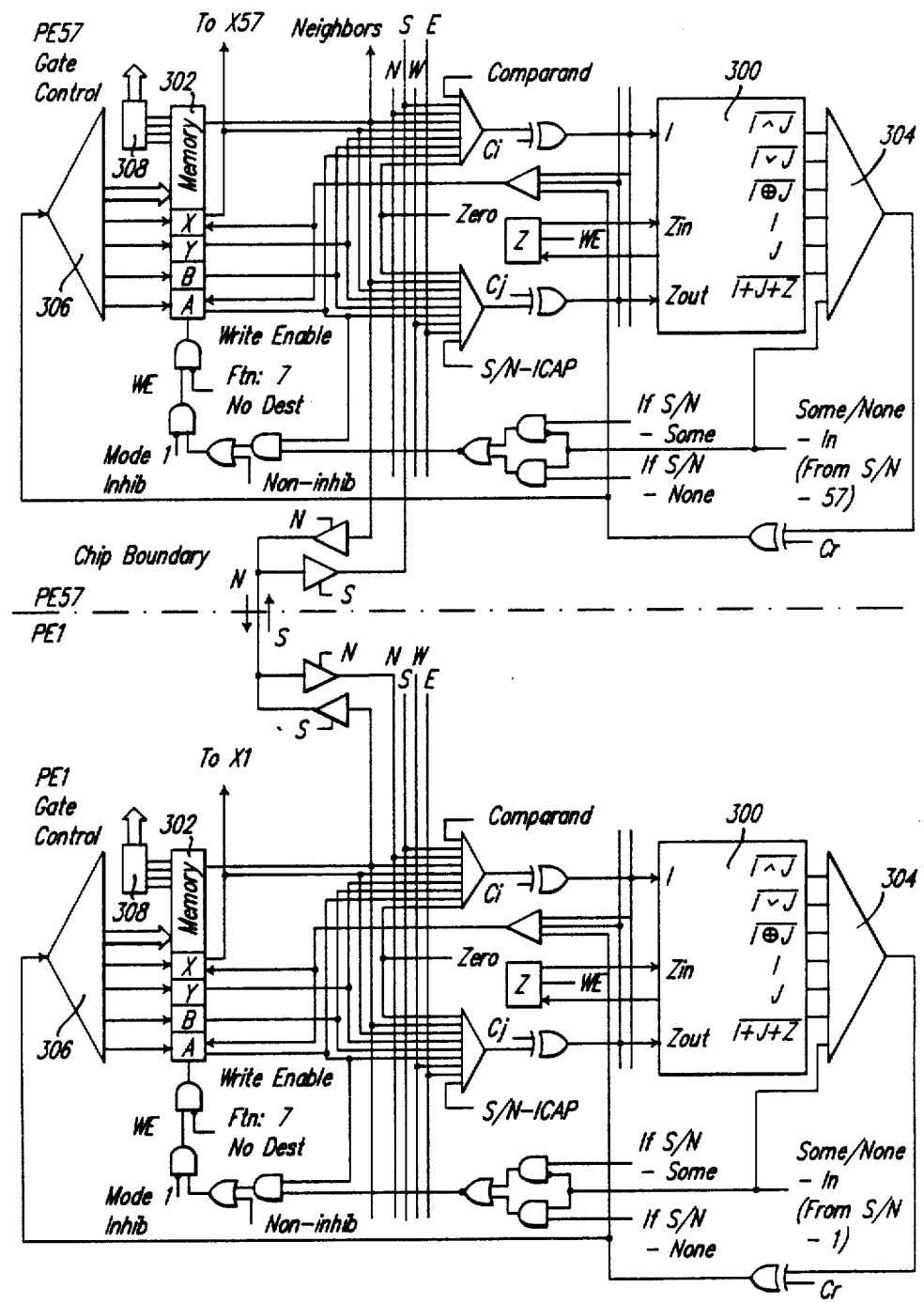
FIG. 19 is a schematic diagram showing in more detail the circuitry for two neighboring PEs.
Figure 20:
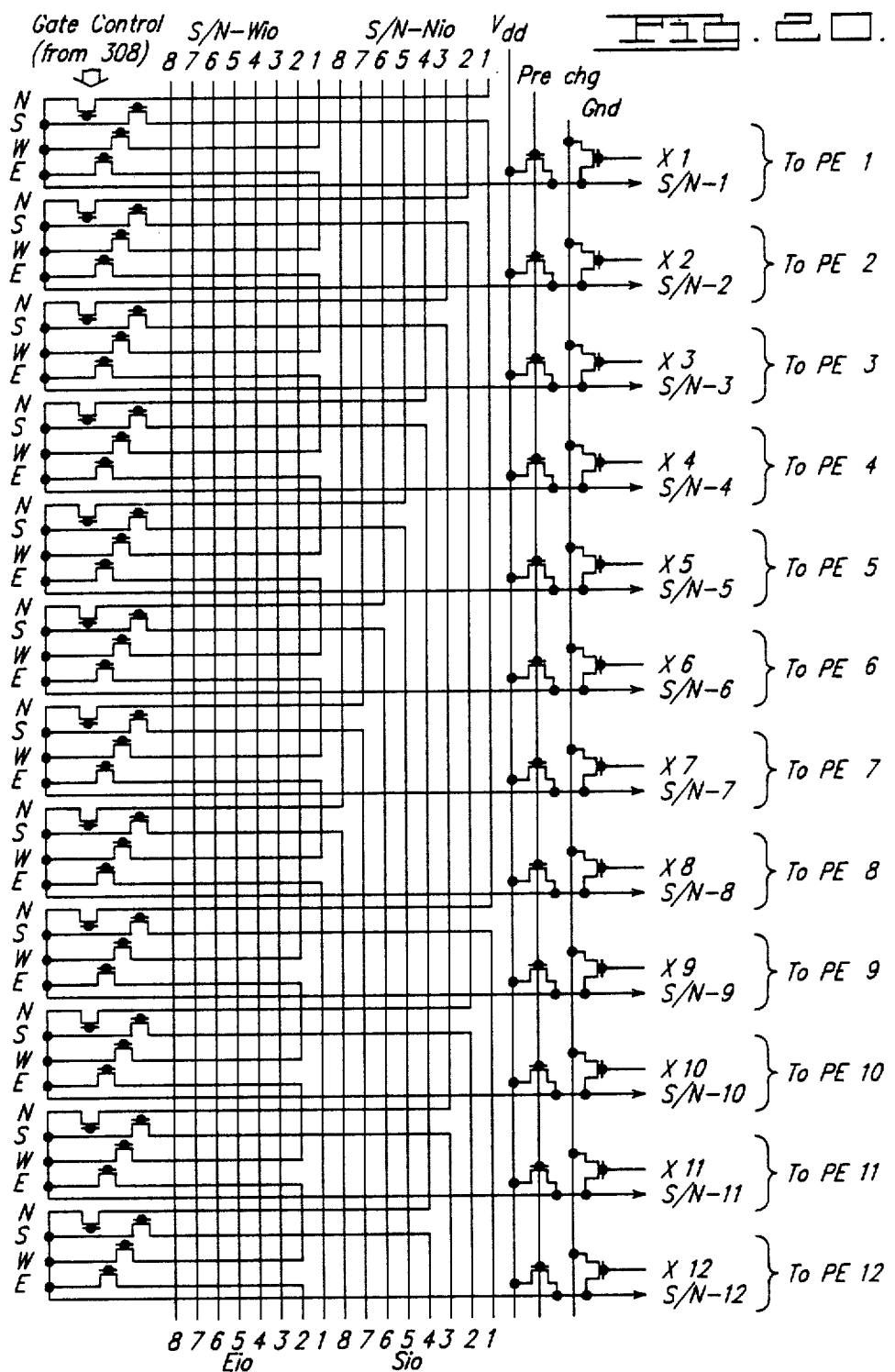
FIG. 20 is a circuit diagram illustrating a portion of a some/none network.

Pursuant to that invention, improvements have been made to the computer architecture including the provision of connections between each of the PEs so that these labels can be applied very quickly according to the method of this invention. According to that invention, gated connections are established between each PE and its neighboring PEs. The term "gate" is a switching device that makes or breaks electrical connection between two points, here two PEs. In this embodiment, there are four such gates since it is necessary to connect each PE to its N, S, E and W neighbor. In FIG. 18 these gates are labeled GN, GE, GS, and GW followed by the numerical reference numeral for its associated PE. Thus, GN1 is the north gate for PE1. The gate structure can take various forms but in the preferred embodiment consists of a series of MOS transistors illustrated in more detail in the left hand portion of FIG. 20. In this embodiment, the gate control signals are provided from static registers associated with given memory address bits in the PE memory, as will appear. A careful tracing of the signal lines in FIG. 20 shows that there is a gated interconnection between a given PE and all of its neighbors as illustrated more simplistically in FIG. 18. Further, there is provided a means for opening or closing the gates as noted above. More of the details of one embodiment of the CAAPP PEs are shown in FIG. 19. These PEs are somewhat similar to those described in connection with FIG. 15 and thus a detailed description is not necessary. Suffice it to say that each PE is a bit serial processor having a bit-serial arithmetic logic unit (ALU) 300, a multi-bit memory 302 and various bit registers X, Y, B and A.

After the image has been loaded into the PE network, the next step is to set up the gate connection. The ultimate objective is to connect contiguous PEs having the same pixel value. With reference to FIG. 18 it can be seen that PE1, PE2, PE3, PE4, PE10, PE11, PE12 and PE20 form a contiguous region R1. Thus, the gates in each of these PEs are closed in a direction towards a PE having the same value but are opened when the neighboring PE has a different value. For example, PE1 and PE2 are connected together by way of closed gates GE1 and GW2. This is because the pixel value of 1 (object) is stored in the memory 302 in each of these PEs. However, PE9 contains a pixel value of 0 (background). As a result, the gates between PE1 and PE9 are open. A study of FIG. 18 reveals that each of the PEs in regions R1 and R2 are connected together but that there is no electrical connection between region R1 and R2.

In this embodiment this gate "set up" step is performed by comparing the value of the pixel stored in each PE with the pixel values stored in its neighboring PEs. With reference to FIG. 19, the pixel value (located in a predefined address in memory 302) is loaded into one of the inputs I or J in ALU 300 whereas the pixel value of a neighboring PE is loaded into the other ALU input. The comparison result is stored at a particular address location in memory 302 via multiplexers 304 and 306. This process occurs sequentially for the other three neighbors. All of the PEs perform this process simultaneously. After this process, the four results are stored in four predefined address locations in memory 302.

A static register 308 or the like is physically connected or resides in this memory address space and is used to provide the control signals to the gates as illustrated in FIG. 20. For example, if the comparison between PE1 and PE2 indicates that the pixel value is the same, the bit position in memory 302 associated with GE1 will provide a logic level sufficient to close that gate. If the comparison indicates otherwise, the logic level will cause gate GE1 to open as is the case for GS1 since PE9 contains a different pixel value.

After the gate "set up" step has been completed, the gate connections should be as illustrated in FIG. 18 for this specific example. Thus, it can be seen that the PEs in each of the regions R1 and R2 are isolated from the background and from each other. Only the PEs in the same region are electrically connected together. Consequently, during subsequent processing, only those PEs which are electrically connected together can influence a result. In this embodiment the result is to derive a unique label for each region R1 and R2. In particular, the objective is to determine which PE in the region has the minimum coordinate and then to use that coordinate as the unique label for all of the PEs in that particular region. Assuming a standard row and column numbering system, all of the PEs in region R1 will be labeled with the coordinate associated with PE1 or as all of the PEs in region R2 will be assigned a label associated with the coordinate of PE25. A method of assigning a unique label to all of the PEs which are connected will now be described.

This method can best be understood in connection with a simplified example. Thus, the reader's attention is drawn to FIG. 21 and the following Table I.

TABLE I

| 1 | for I: = 17 down to 0 do | |
|---|---|---|
| 2 | Begin | |
| 3 | X—flag: = —M(S+I) | X—flags of active cells are updated |
| 4 | if SOME then<br>A—reg: = X—flag | A—regs of active cells will be updated only if some flags of region pixels are set |
| 5 | M(LBL+I):= —SOME/NONE! | all region cells will store the some/none result in its label field |
| 6 | End) | |

Note:
M(I) refers to the I—th bit of memory in a cell. S is the starting bit position of coordinate filed (CF).
LBL is the starting bit position of label field. An operation with a trailing exclamation point (!) will ignore the value of the activity bit (i.e. A—reg) and take place on all cells (e.g. instruction in line 5).

Assume, for example, that there are five pixels in a particular region and they have been connected together pursuant to the "gate set up" sequence described above.

The first general step is to concatenate the row and column coordinates of each PE into one multi-bit word. In this example, 18 bits in memory 302 are reserved for this purpose and is referred to as the coordinate field (CF). Various concatenation techniques can be employed. In this embodiment, the row coordinate of each PE is multiplied by 512 to which the column coordinate is added plus one. In the simplified example shown in FIG. 21 let us assume that this concatenation results in Arabic numerals 2, 3, 4, 5 and 6 for the five PEs in the region. The binary equivalents of these Arabic concatenation numbers are set forth below their Arabic numeral counterparts in line I, which stands for initialization. Since the Arabic numbers are small in value they only require three bit positions to represent them in the binary domain. However, as noted above many more such bit positions are available.

With additional reference to FIG. 19, the A registers in each of the PEs, as well as the X registers therein, are all loaded with a binary value of 1 as represented in step 0 in FIG. 21. The memory 302 also has address space therein reserved for the ultimate label for each of the PEs. This is indicated in FIG. 21 as M(LBL). It will be remembered that since the objective in the preferred embodiment is to label all PEs within the region with the minimum coordinate value of a PE in that region that the ultimate objective will be to generate the value 010 (for binary 2) in the memory label field of each of the PEs in that region.

To arrive at the ultimate label for each of the PEs, a series of some/none tests are conducted while stepping through the bits of each of the concatenated coordinate values. In the specific example, the most significant bit of the concatenated coordinate field is inverted and loaded into the X register. This is shown in step 1 in FIG. 21 where the X registers of PEs 2 and 3 (since their most significant bits are 0) have the value 1 whereas the other PEs (4, 5 and 6) have their X registers set to 0. In such manner, it is possible to eliminate PEs 4, 5 and 6 as potential candidates for the label since it is known that they will have a larger coordinate field concatenated number.

Then, a some/none test is made to determine if some or none of the X registers in the region PEs have been set to the value on 1. This can be accomplished quite easily due to the connection of the gates as shown particularly in FIG. 20. The nomenclature X1 in FIG. 20 means that it is connected to the X register in PE1, X2 is connected to the X register PE2, etc. The line labeled S/N-1 in FIG. 20 is connected back to the PE. Similar nomenclature is used: S/N-1 being associated with PE1, S/N-2 being the some/none result that is transferred back to PE2, etc. Consequently, if an X register in any of the connected PEs has the value of 1, this will cause all of the S/N output lines back to the PEs to be driven to ground level. On the other hand, if none of the X registers in the connected region are set to 1, then the S/N output will not be grounded. (It should be understood that the nomenclature used in FIG. 20 employs a generic transistor symbol in which the line through the ball represents the gate that controls conduction between the source and drain regions of the various transistors shown therein.)

Thus, the some/none test will indicate that some of the PEs (namely PE2 and 3) in the region have their X registers set to 1 in step 1. The most significant bit in the label field is set to the inversion of this some/none test. In the specific example, this means that the most significant bit in the label field M(LBL) in each of the PEs will be set to 0. This is correct since it will be remembered that the ultimate objective is to assign labels 010 to each of the PEs. The contents of the A registers will be changed or updated to reflect the contents of their associated X registers only if the some/none test is positive. Since in step 1 the some/none test was positive, the A registers are set to 1 to indicate that their associated PEs are still active.

In step 2 of the method, the shrinking down process continues to the second most significant bit for those PEs that are active, i.e., PEs 2 and 3 having their activity bit (A register) set to 1. The X registers of PEs 2 and 3 are again set to the inverse of the second most significant bit. Thus, their X registers are set to 0. A some/none test is conducted as described above. In this case, none of the active PEs have their X registers at a 1 level. Consequently, their A registers remain the same. In addition, the label field for the most significant bit of all of the PEs is set to 1 (the inverse of the some/none test results). This is correct since the ultimate objective is to apply 010 as the label field.

In step 3, the X registers are set to the inverse of the least most significant bit. In this case the X register of PE2 is set to 1 since its least most significant bit is a 0 whereas the X register of PE3 is set to 0 since its least most significant bit is 1. Again, a some/none test is conducted as described above. Here, some of the active PEs (i.e., PE2) has its X register at a 1 level. Consequently, the least significant bit of the label field M(LBL) is set to the inverse of the some/none test, i.e. 0. Thus, all of the connected PEs in the region will have their label fields set to 010 (here the PE2) the minimum coordinate value of a PE in that region.

It will be appreciated that all of the PEs in the image understanding machine will be performing these steps simultaneously. Referring to FIG. 18 this would mean that all of the PEs in region R1 would have labels associated with the coordinate of PE1 whereas all of the connected PEs in region R2 would have labels associated with the coordinate value of PE25. Those skilled in the art can appreciate that this technique is considerably faster than those employed in other systems. With all of the regions having been assigned unique label fields, the IUM can now easily perform higher level processing of the image.

G. Improved Gated Architecture

Figure 22:
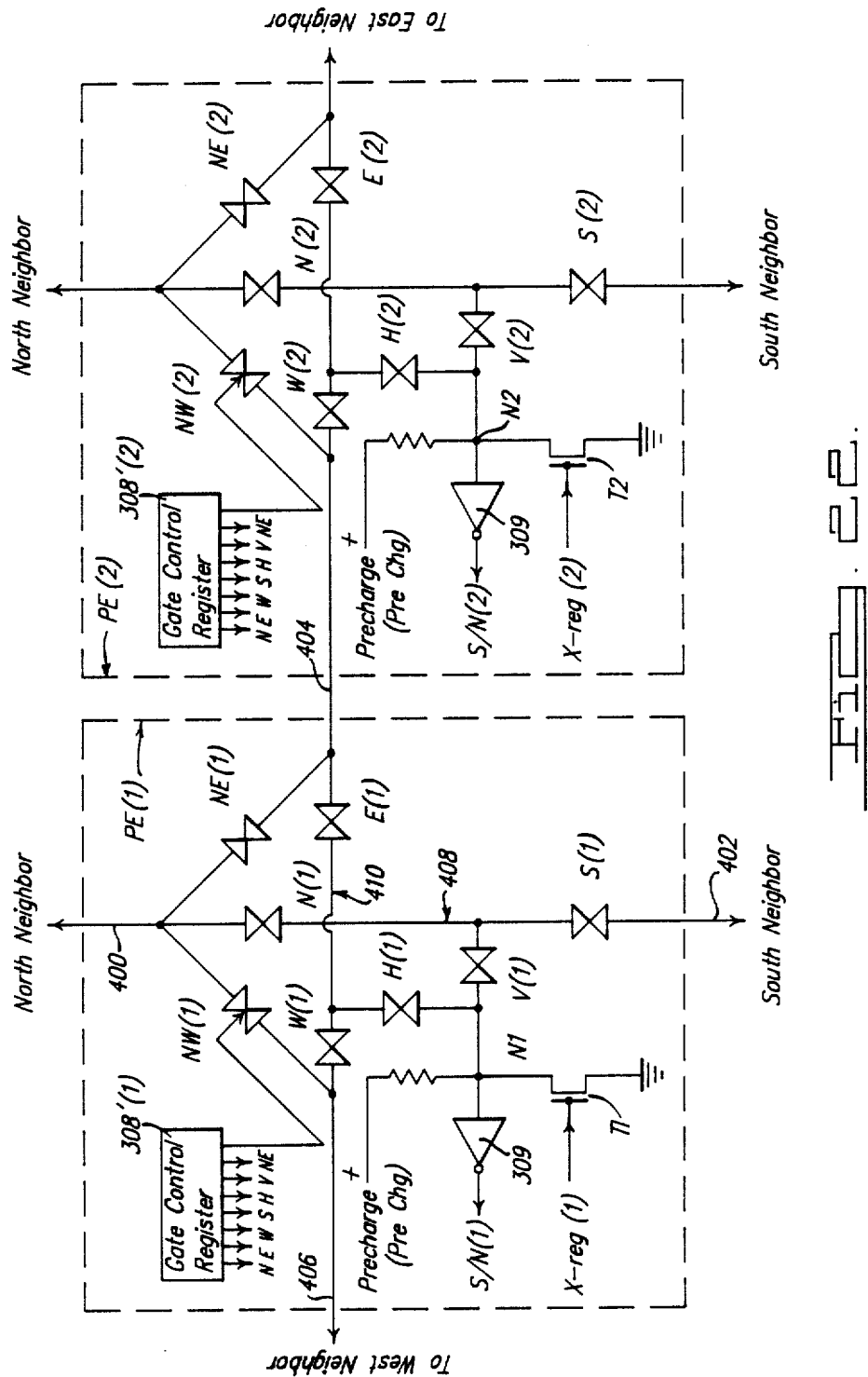
FIG. 22 illustrates the gated connections for two adjacent CAAPP PEs in accordance with the teachings of the improvements of the present invention.

FIG. 22 illustrates the gated connections for two adjacent CAAPP PEs labeled PE(1) and PE(2). However, it should be understood that the present invention envisions a much larger array of CAAPP PEs such as a 512×512 array as discussed earlier herein. Each PE is provided with eight different individually controllable gates. In addition to the North (N), South (S), East (E), and West (W) gates there is provided four additional gates, namely Northwest (NW), Northeast (NE), Horizontal (H) and Vertical (V) gates. All eight of the gates are driven (i.e., opened or closed) as a function of the states of selected bit positions in gate control register 308'. The control bits can be loaded from memory 302 (FIG. 19) with one instruction. This same instruction can also be used to shift eight or four bits of RAM memory 302 to facilitate floating point operations.

Each PE is connected to its neighbors by four electrically conductive lines 400, 402, 404 and 406 running in the North, South, East and West direction, respectively. The North line 400 and South line 402 are connected together to form a vertical line 408 through each PE for connecting it with vertically oriented PEs in the array. Similarly, the East line 404 and West line 406 are connected together to form a horizontal line 410 which is electrically isolated from the vertical line 408.

The remainder of the CAAPP PE construction is substantially the same as previously described in connection with FIGS. 19 and 20. Consequently, those functions will not be reiterated here.

The logical state of each PE is determined by the voltage on a node (N1, N2) determined by the conductivity state of an associated transistor (T1, T2). The conductivity of the transistor in each PE is determined by the state in each PE's X register. For example, a logical 1 in the X register of PE1 would cause transistor T1 to conduct thereby drawing node N1 to ground. The logical state can be stored back into the memory 302 of a PE via inverter 309. The output of inverter 309 is referred to as the some/none output which means that if any of the X registers of any connected PEs is one, then the some/none output on the S/N line for all of the connected PEs will also equal to be one. For example, as shown in FIG. 22, if gates H(1), E(1) of PE(1) and H(2), W(2) of PE(2) are closed, then S/N(1) and S/N(2) are equal to the wired OR of the X registers of PE(1) and PE(2) which are connected as a result of the closed gates. The some/none signal on line S/N of any PE may be used to control the activity of that PE, if so desired. It is also possible to disable all of the gate connected PEs which have their some/none values equal to some, i.e., a logical one. Therefore, different groups of gate connected PEs can operate differently because each group may have different local some/none outputs even though they may receive the same instruction. Accordingly, PEs on the same level can perform different or data dependent operations even though they receive the same instructions.

As can be seen in FIG. 22, the vertical gate V(1) is connected between the node N1 and the vertical line 408. Horizontal gate H(1) is connected between node N1 and the horizontal line 410. Northwest gate NW(1) is connected between the North line 400 and West line 406. Northeast gate NE(1) is connected between the North line 400 and East line 404. The North N(1), South S(1), East E(1) and West W(1) gates are located in lines 400, 402, 404, and 406, respectively.

The use of the horizontal (H) and vertical (V) gates in each PE enables the computer architecture to isolate horizontal and vertical rows of CAAPP PEs that may intersect thereby enabling the connected PEs in the horizontal rows to perform a different operation than the vertically connected PEs, even though the two rows may intersect. For example, if gate H(1) is open in PE(1) then none of the PEs on that same horizontal row can influence the some/none output S/N(1) of PE(1). Similarly, if gate V(1) is open, then the S/N(1) output cannot be influenced by other vertically connected PEs. This ability to isolate rows and columns is particularly useful in solving minimum spanning tree and other algorithms where it expedites the performance of the algorithm if it is possible to isolate horizontal and vertically connected nets.

The NW and NE gates likewise provide the computer architecture with increased flexibility leading to better efficiency in performing certain types of algorithms. For example, by closing gates NW(1) and opening the other gates in PE(1), it is possible to connect the West neighbor to the North neighbor of PE(1) without having PE(1) influence the some/none results in the two diagonally connected neighbors. The NE gate similarly can be used to connect PE(2) to the North neighbor of PE(1). This capability is particularly useful in performing component labelling and Hough transform routines.

It should be understood that while this invention has been described in connection with a particular example thereof, those skilled in the art will realize that other modifications can be made without departing from the spirit and scope of this invention after having the benefit of studying the specification and following claims.

What is claimed is:

1. A computer architecture for performing iconic and symbolic operations, said architecture comprising:

an array of substantially identical processing elements (PE) arranged in horizontal rows and vertical columns, each PE having electrically conductive lines running in the North, South, East and West directions connected to neighboring PEs in those directions, respectively; the North and South lines being connected together to form a vertical line, with the East and West lines being connected together to form a horizontal line;

each PE having a node with a programmable voltage level thereon representing a given logical state of the PE, the array being arranged so that said logical state on the node can be simultaneously shared between PEs which are connected together;

a vertical gate connected between the vertical line and the node in each PE to thereby permit selective connection of PE nodes in a column together;

a horizontal gate connected between the horizontal line and the node in each PE to thereby permit selective connection of PE nodes in a row together;

control means for opening and closing the gates; and memory means in each PE coupled to said node for storing a some/none result related to whether some or none of the nodes of the connected PEs are in a given logical state.

2. The architecture of claim 1 which further comprises a West gate in the West line, with the control means being adapted to open and close said West gate.

3. The architecture of claim 1 which further comprises:
an East gate in the East line, with the control means being adapted to open and close said East gate.

4. The architecture of claim 1 which further comprises:
a North gate in the North line, with the control means being adapted to open and close said North gate.

5. The architecture of claim 1 which further comprises:
a South gate in the South line, with the control means being adapted to open and close said South gate.

6. The architecture of claim 1 which further comprises:
a Northwest gate between the North line and the West line, with the control means being adapted to open and close said Northwest gate.

7. The architecture of claim 1 which further comprises:
a Northeast gate between the North line and the East line, with the control means being adapted to open and close said Northeast gate.

8. The architecture of claim 1 wherein each PE includes:
a programmable digital memory; and
a multi-bit control register coupled to the memory, each bit in the control register determining whether a particular gate is opened or closed.

9. The architecture of claim 1 wherein each processing element is a bit serial processor including an arithmetic logic unit.

10. An image understanding machine comprising:
a first level of image processing elements for operating on an image matrix on a pixel per processing element basis;
a second level of processing elements associated with a group of first level processing elements;
a third level of processing elements associated with a given number of second level processing elements;
a host computer communicating with at least the third level processing element; and
said first level of processing elements being an N×N array of bit serial processors including an arithmetic logic unit and a multi-bit memory, each PE having electrically conductive lines running in the North, South, East and West directions connected to neighboring first level PEs in those directions, respectively; the North and South lines being connected together to form a vertical line, with the East and West lines being connected together to form a horizontal line; a node having a programmable voltage level thereon, a vertical gate connected between the vertical line and the node, a horizontal gate connected between the horizontal line and the node, a North gate in the North line, an East gate in the East line, a South gate in the South line, a West gate in the West line, a Northeast gate connected between the North line and the East line, a Northwest gate connected between the North line and the West line; control means for controlling the opening and closing of said gates; and
a some/none line coupled between the node and the memory whereby the state of the some/none line is a function of the voltage level on the nodes of those PEs which are connected together by said gate.

11. The machine of claim 11 wherein each PE includes register means coupled to the node for controlling the voltage level thereon.

12. The machine of claim 12 wherein said control means comprises a multi-bit register, with the states of the bits of each register controlling the opening and closing of an associated gate.

* * * * *